March 23, 1948.  A. SIMMON  2,438,303
DEVICE FOR MAKING COLOR PRINTS
Filed Feb. 28, 1947  13 Sheets-Sheet 2
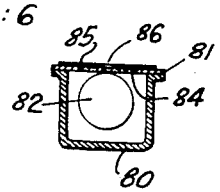
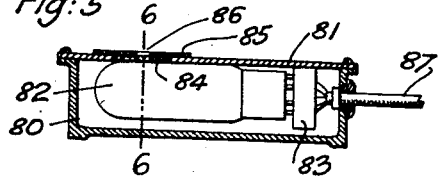
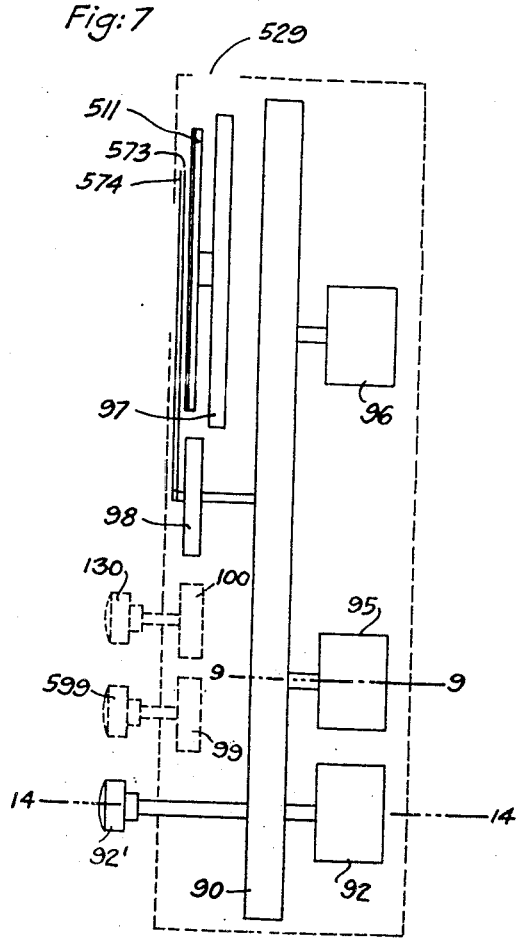
Alfred Simmon
INVENTOR.
BY Walter S. Wielheim
ATTORNEY Alfred Simmon
INVENTOR.

BY Walter E. Wollheim
ATTORNEY

March 23, 1948.    A. SIMMON    2,438,303
DEVICE FOR MAKING COLOR PRINTS
Filed Feb. 28, 1947    13 Sheets-Sheet 6
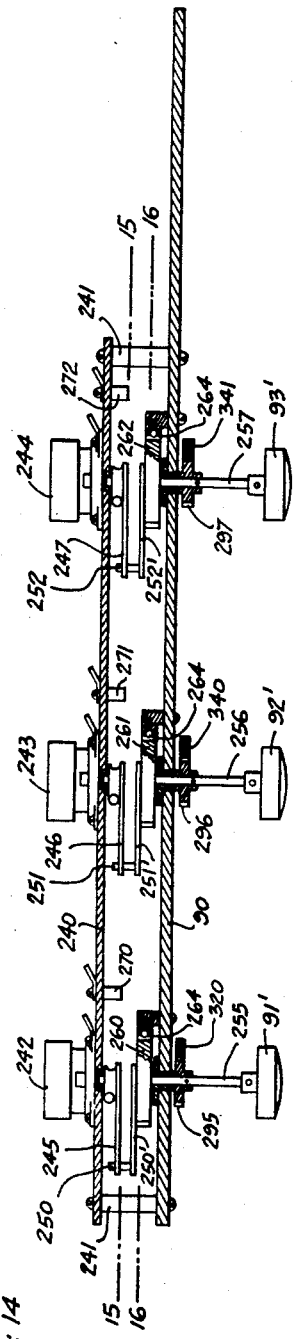
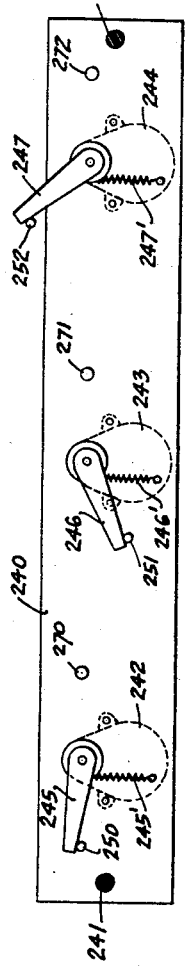
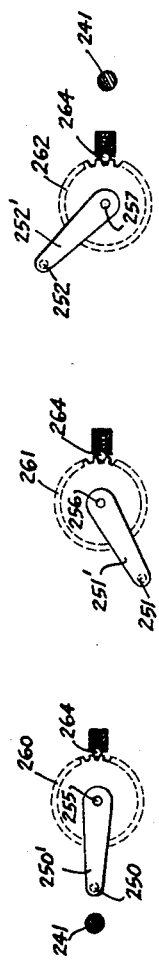
Fig.14
Fig.15
Fig.16
Alfred Simmon
INVENTOR.
BY Walter E. Wallheim
ATTORNEY.

March 23, 1948.  A. SIMMON  2,438,303
DEVICE FOR MAKING COLOR PRINTS
Filed Feb. 28, 1947  13 Sheets-Sheet 7
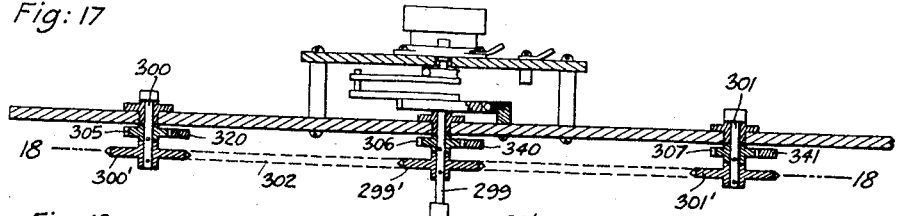
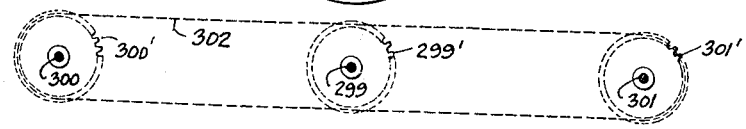
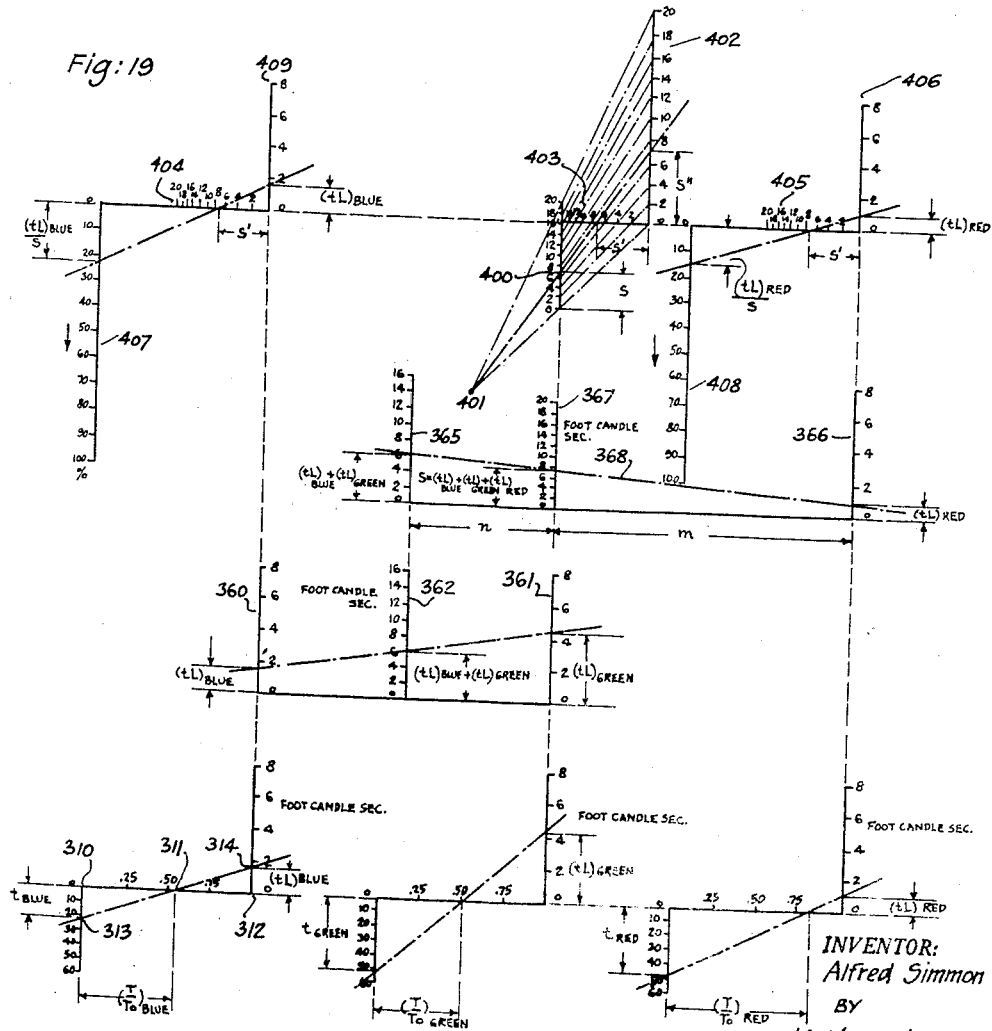
INVENTOR:
Alfred Simmon
BY
Walter E. Wollheim
ATTORNEY.

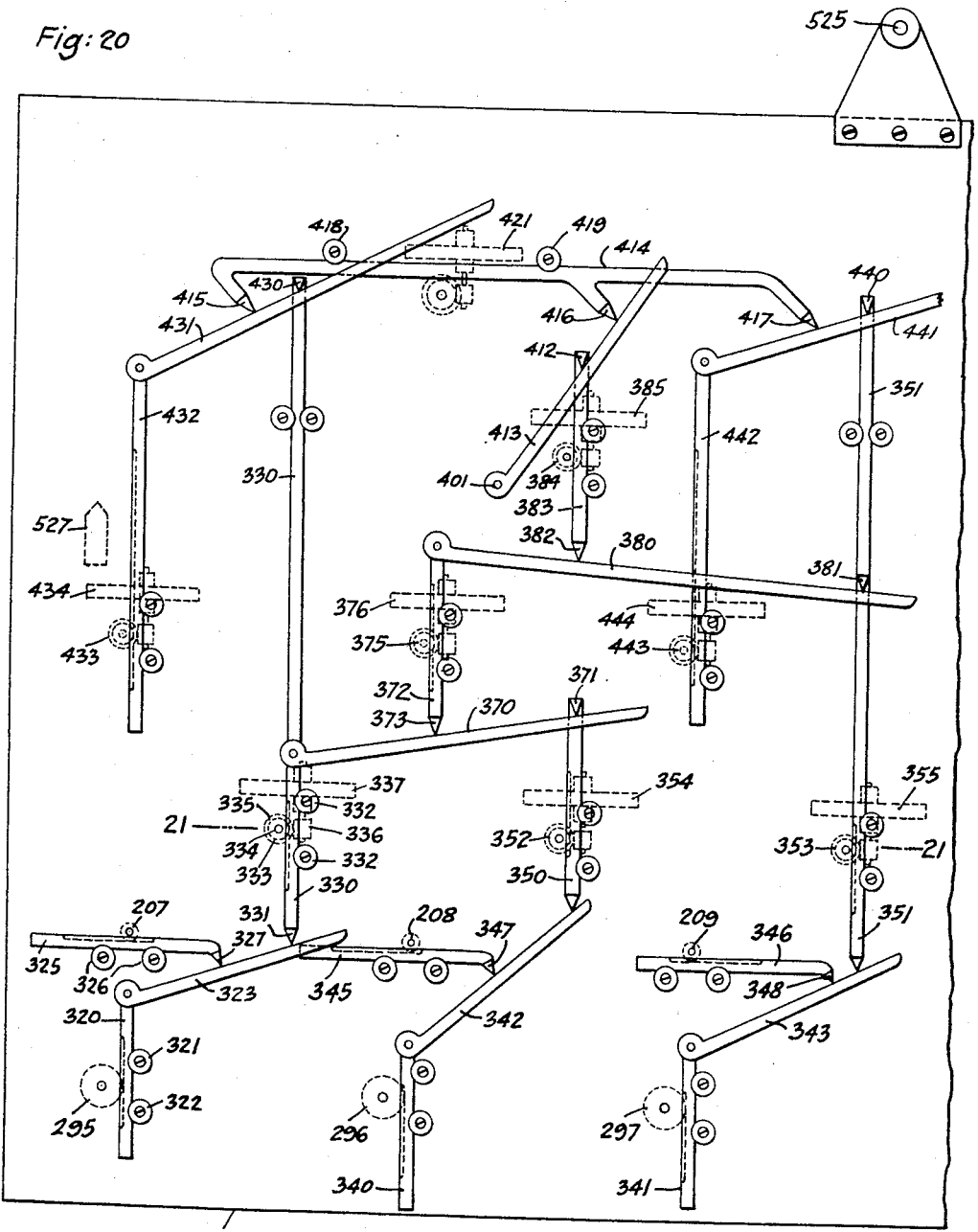

March 23, 1948. A. SIMMON 2,438,303
DEVICE FOR MAKING COLOR PRINTS
Filed Feb. 28, 1947 13 Sheets-Sheet 9
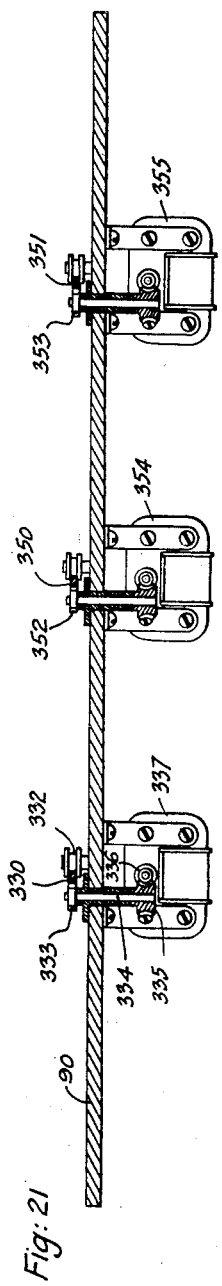
Fig. 21
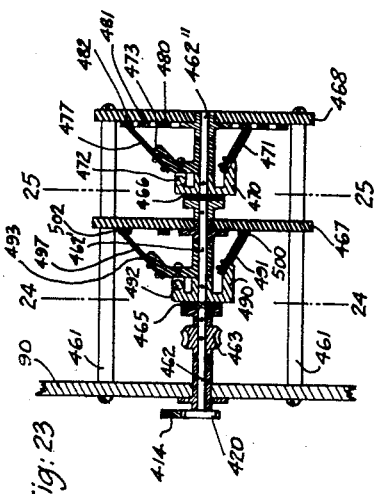
Fig. 23
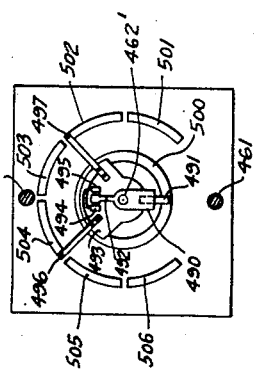
Fig. 24
Fig. 25
Alfred Simmon
INVENTOR.
BY Walter E. Wollheim
ATTORNEY.

March 23, 1948.   A. SIMMON   2,438,303
DEVICE FOR MAKING COLOR PRINTS
Filed Feb. 28, 1947   13 Sheets-Sheet 10

Alfred Simmon
INVENTOR.

BY Walter E. Wallheim
ATTORNEY.

March 23, 1948.   A. SIMMON   2,438,303
DEVICE FOR MAKING COLOR PRINTS
Filed Feb. 28, 1947   13 Sheets-Sheet 11

Alfred Simmon
INVENTOR.

BY Walter E. Wollheim
ATTORNEY.

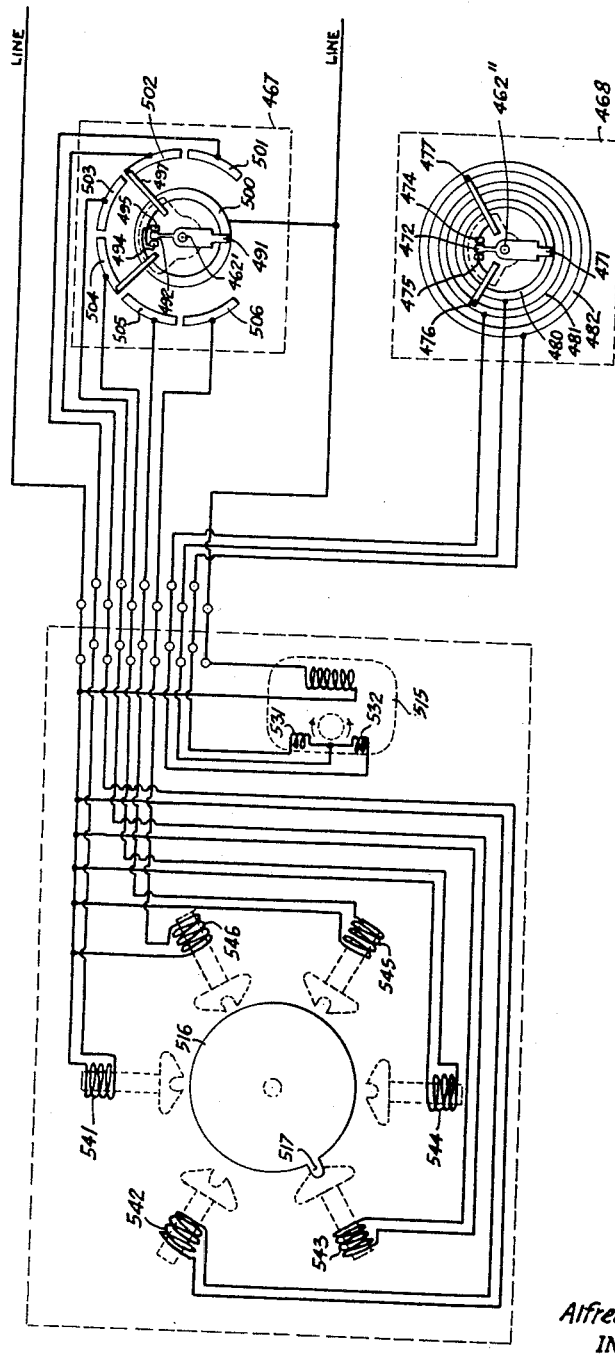

March 23, 1948.  A. SIMMON  2,438,303
DEVICE FOR MAKING COLOR PRINTS
Filed Feb. 28, 1947   13 Sheets-Sheet 13
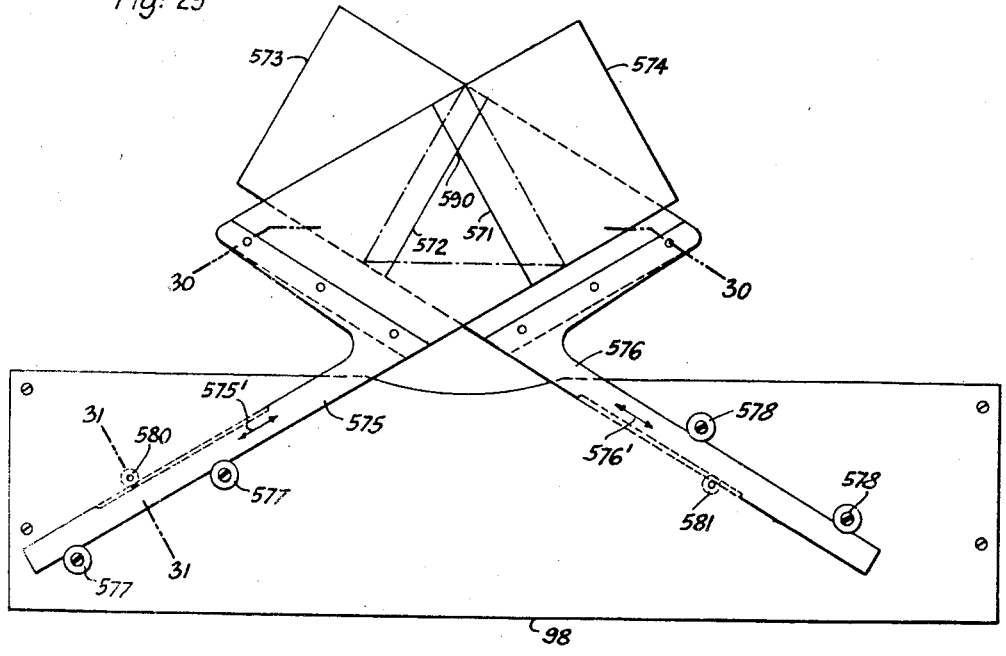
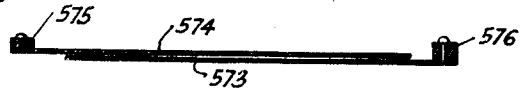
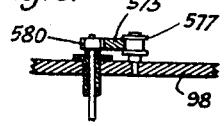
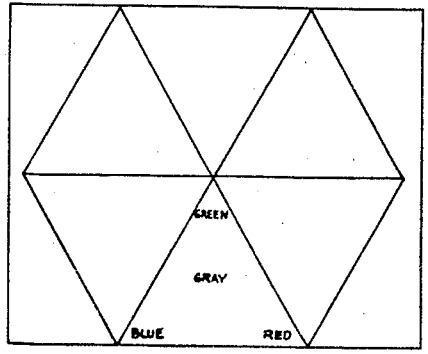
Alfred Simmon
INVENTOR.
BY *Walter E. Wollheim*
ATTORNEY.

Patented Mar. 23, 1948

2,438,303

UNITED STATES PATENT OFFICE 2,438,303

DEVICE FOR MAKING COLOR PRINTS

Alfred Simmon, Jackson Heights, N. Y., assignor to Simmon Brothers, Inc., Long Island City, N. Y., a corporation of New York Application February 28, 1947, Serial No. 731,435

15 Claims. (Cl. 88—24)

The object of this invention is a device for making color prints. Color prints are made on color print material from transparencies. The color print material may be of two general types, the monopack or the separation-transfer type. In the monopack, three layers of emulsion are coated superimposed upon each other on a common base made from white paper or some other white material. The images formed within these three emulsions after the exposure are colored with three different dyes of suitable colors. In the separation-transfer type, three individual emulsions on separate sheets are, after exposure, subjected to a similar dye treatment, and the colored images are thereafter transferred to a common white base.

The transparency from which the color print is made may again be of either the monopack or the separation type. In either case, it contains some record of the light intensity of three primary colors for each point of the image. A monopack transparency contains records of the three intensities in three different colors, whereas the other method makes use of three separate negatives which form the records of the three respective light intensities.

As the first step in my method to make color prints, I make a test print on the chosen type of color print material. This test print contains a large number of areas or points which are, respectively, subjected to different combinations of intensity and time conditions of light producing, respectively, three primary colors. These areas may be arranged in many different patterns and a preferred one will be described in detail later.

The transparency from which the print is made is placed into a printer which includes a source of light, and the respective intensity of the light producing the three primary colors for selected points of the three transparencies is measured. These intensity values are then combined with chosen exposure time values to obtain sets of three intensity × time values for the three primary colors for each selected point, and an area, or more specifically, a point within a selected area, is traced on the test print which was subjected to substantially the same intensity × time conditions. It is obvious that the area or point traced in this manner on the test print will have a color and density identical to the color and density to be expected for this particular point on the print to be made from this transparency. The appearance of a print to be made under given or assumed conditions can thereby be predicted and if the color or density with which certain selected points will be reproduced appears unsatisfactory, these conditions may be adjusted before a print is made. In view of the fact that the results of all color print processes are quite sensitive to apparently small changes of light intensity and time conditions, this method affords not merely improved results, but also a great saving of time and expense.

A machine constructed according to this invention comprises therefore a printer, a light measuring device, a timer, a computing device, and a device to select certain areas on a test print and/or locate certain points thereon in accordance with results obtained by the computing device.

A preferred embodiment of the invention is shown in the attached drawings and described in the appended specification:

In the drawings,

Fig. 1 illustrates the general arrangement of the entire device showing the various parts in their relative positions;

Fig. 2 is a plan view of an electrically operated three color filter which may be part of the printer; Fig. 3 is a sectional view along the plane of line 3—3 in Fig. 2; and Fig. 4 is an electric circuit of the printer illustrated in Figs. 2 and 3;

Fig. 5 shows a sectional view of a photocell and a housing therefor, being component parts of the light measuring device; and Fig. 6 is a sectional view along the plane of line 6—6 in Fig. 5;

Fig. 7 is a diagrammatic cross-sectional view along the plane of line 7—7 in Fig. 1 through the main unit of the machine which comprises all elements other than the printer and the photocell;

Figure 9:
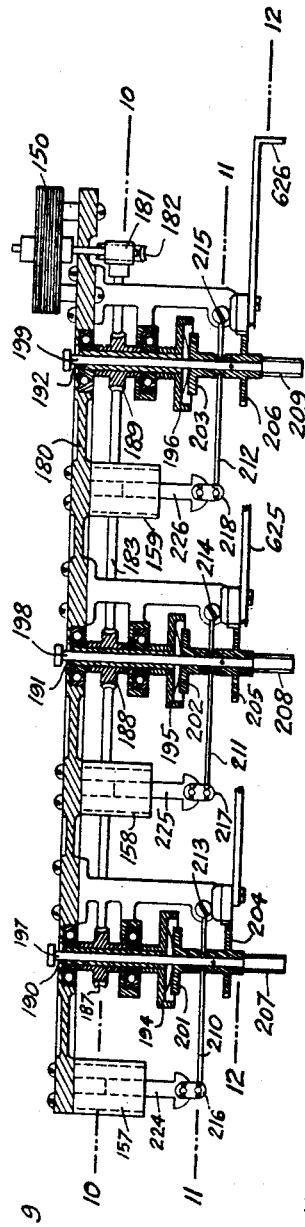
Figure 10:
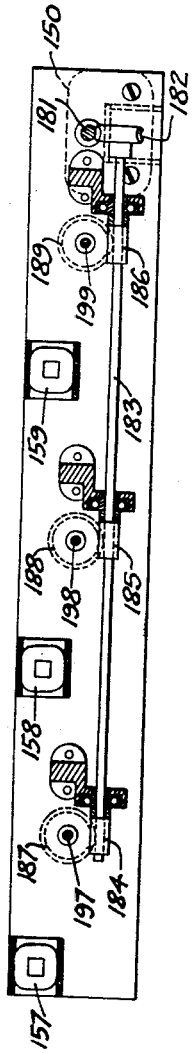
Figure 11:
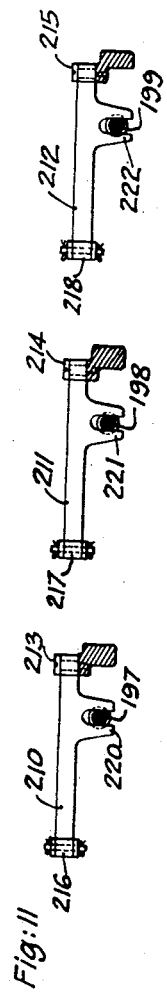
Figure 12:
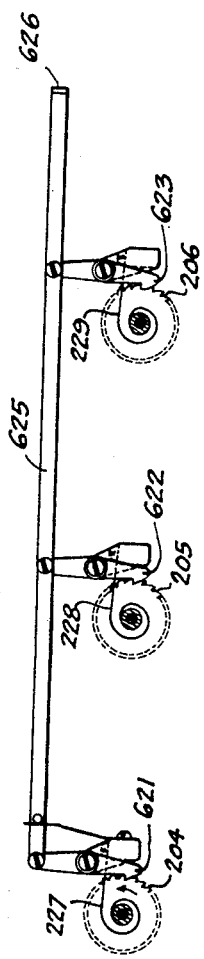
Figure 13:
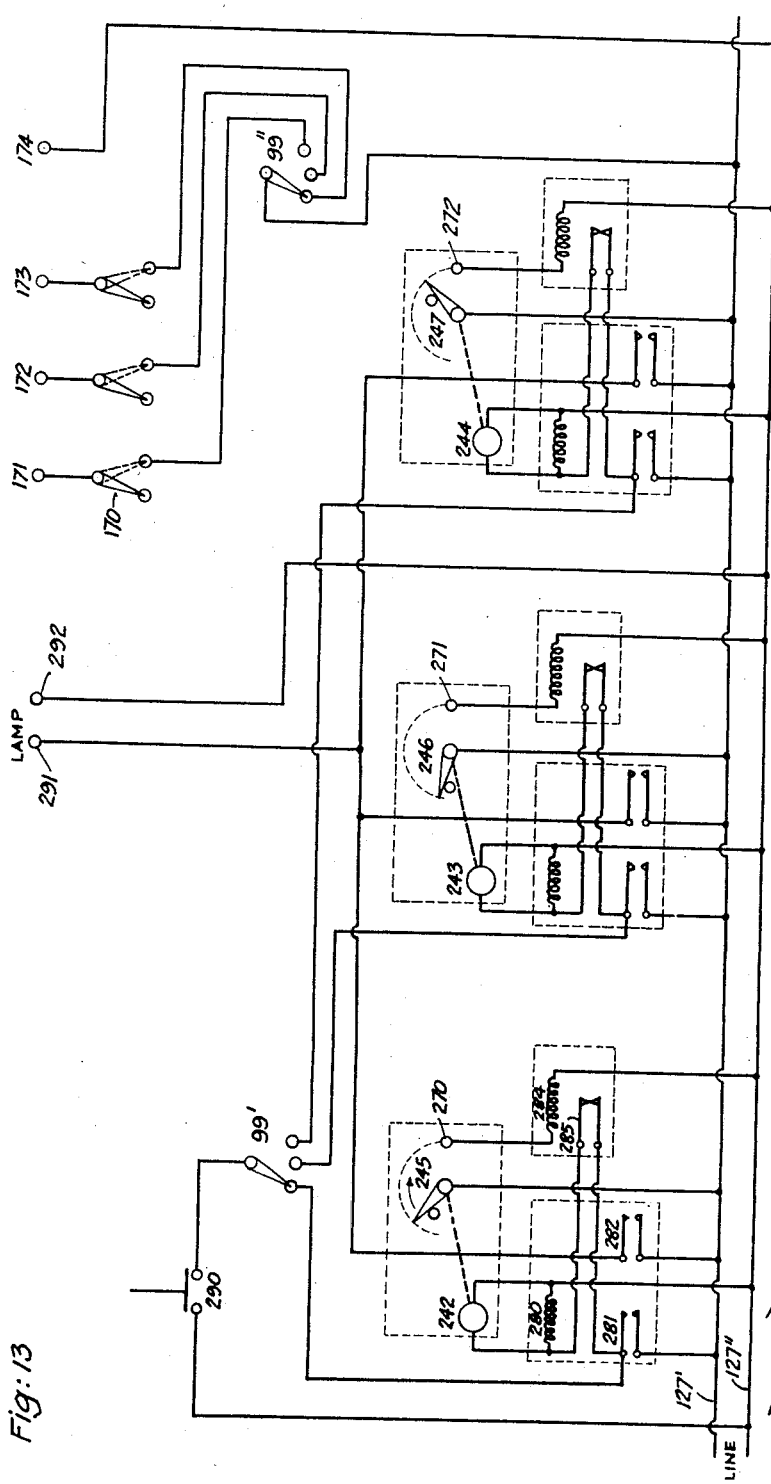

Fig. 9 is a sectional view of the mechanical design of the light measuring unit along the plane of line 9—9 in Fig. 7; and Figs. 10, 11 and 12 are sectional views along, respectively, the planes of lines 10—10, 11—11 and 12—12 in Fig. 9;

Fig. 13 is an electric circuit of a triple time switch;

Fig. 14 shows a horizontal sectional view of the mechanical design of the triple time switch along the plane of line 14—14 in Fig. 7; and Figs. 15 and 16 are sectional views along, respectively, the planes of lines 15—15 and 16—16 in Fig. 14;

Fig. 17 is a horizontal sectional view of an alternate construction of a time switch; and Fig. 18 is a sectional view along the plane of line 18—18 in Fig. 17;

Fig. 19 is a nomographic diagram forming the mathematical basis for the design of a computing device;

Fig. 20 is a view of the mechanical elements of the computing device; Fig. 21 is a sectional view along the plane of line 21—21 in Fig. 20; and wheels 593 and 130 which are associated, respectively, with the time switches and the light measuring device. The housing also contains numerous other electric elements such as condensers, rectifying tubes, thyratrons and resistors which are not shown since their precise position within this housing is of no consequence. The function of these elements, however, will be fully explained with the aid of circuit diagrams for the various components of this invention.

*Electrical circuit for light measuring device*

The light measuring device itself can be of any convenient type or description and it does not even necessarily have to comprise a photoelectric cell. In practice, however, a photoelectric cell is, of course, much to be preferred over other means of measuring light intensities and, while again any of the numerous types of photoelectric cells is theoretically applicable, I prefer to use a photoelectric cell of the so called electron multipler type since the required sensitivity can most easily be obtained therewith.

The electric circuit associated with this cell must be adapted to measure light of a very low intensity since the illumination upon the surface of a photographic enlarger is apt to be of a very low order of magnitude. It is known that it is expedient for this purpose to use a condenser in series with the photoelectric cell and to measure the time which it takes to charge or discharge this condenser. While it is theoretically unimportant whether the condenser is being charged or discharged during this process, more convenient circuit relations can be obtained by having the condenser charged, and this is shown in the following example. The current that passes the photoelectric cell is substantially proportional to the intensity of the incident light. The charging or discharge time of the condenser, however, is inversely proportional to the current with which it is being charged or discharged, and consequently for a circuit of this type charging or discharge times of the condenser for zero light intensity become infinite, and for low light intensities these times become very long. This is objectionable for a number of reasons, for example, with very long charging or discharging times, incidental small leakages may falsify the result completely. In order to overcome this condition, I provide two parallel but otherwise independent charging circuits for the condenser. The current passing the first circuit is controlled by the photoelectric cell and is at least substantially proportional to the light intensity to be measured. The current passing the second circuit is constant and entirely independent of the light intensity, but may, of course, for convenience, be adjusted to a suitable value where it will be left during the operation of the device. The result of this arrangement is that for zero light values, i. e., absolute darkness, a definite condenser charging time is obtained and that by this expedient convenient and efficient circuit conditions can be easily arranged.

For reasons which will become apparent later, it is important to express the relation between light intensity and condenser charging time for a circuit of the above description.

If we call

C=condenser capacity
T=condenser charging time
E=condenser voltage
$i_1$=condenser charging current through multiplier tube in μA (micro-amps.)
K=multiplier sensitivity in μA/foot-candles
L=light intensity in foot-candles on easel surface
$i_2$=condenser charging current through auxiliary circuit in μA
t=exposure time of print in seconds and if we assume that the condenser is charged from a zero voltage, the condenser voltage E can be expressed as follows:

$$E = \frac{T}{C}(i_1 + i_2) = \frac{i_2 T}{C}\left(\frac{i_1}{i_2} + 1\right)$$

This can be rearranged to read:

$$T = \frac{CE}{i_2}\left(\frac{1}{\frac{i_1}{i_2} + 1}\right)$$

For zero light intensity $i_1$ becomes zero and the condenser charging time for this condition shall be called $T_0$. By substituting $i_1 = 0$ in the above formula for T, we obtain:

$$T_0 = \frac{CE}{i_2} \text{ and } T = T_0\left(\frac{1}{\frac{i_1}{i_2} + 1}\right)$$

This formula can be resolved for $$\frac{i_1}{i_2}$$

and for $i_1$ the value KL can be substituted:

$$\frac{i_1}{i_2} = \left(\frac{T_0}{T} - 1\right); \quad \frac{KL}{i_2} = \left(\frac{T_0}{T} - 1\right)$$

As will be noted later, it is expedient to multiply both sides with the exposure time t so that the formula reads:

$$\frac{K}{i_2}(Lt) = t\left(\frac{T_0}{T} - 1\right)$$

As will be noted in a later paragraph, it is a peculiar advantage of this double charging circuit that by obeying a relation as expressed in the above formula, it lends itself easily to a combination with an extremely simple mechanical computing device by means of which the light intensity can be computed from the charging time of the condenser.

Figure 8:
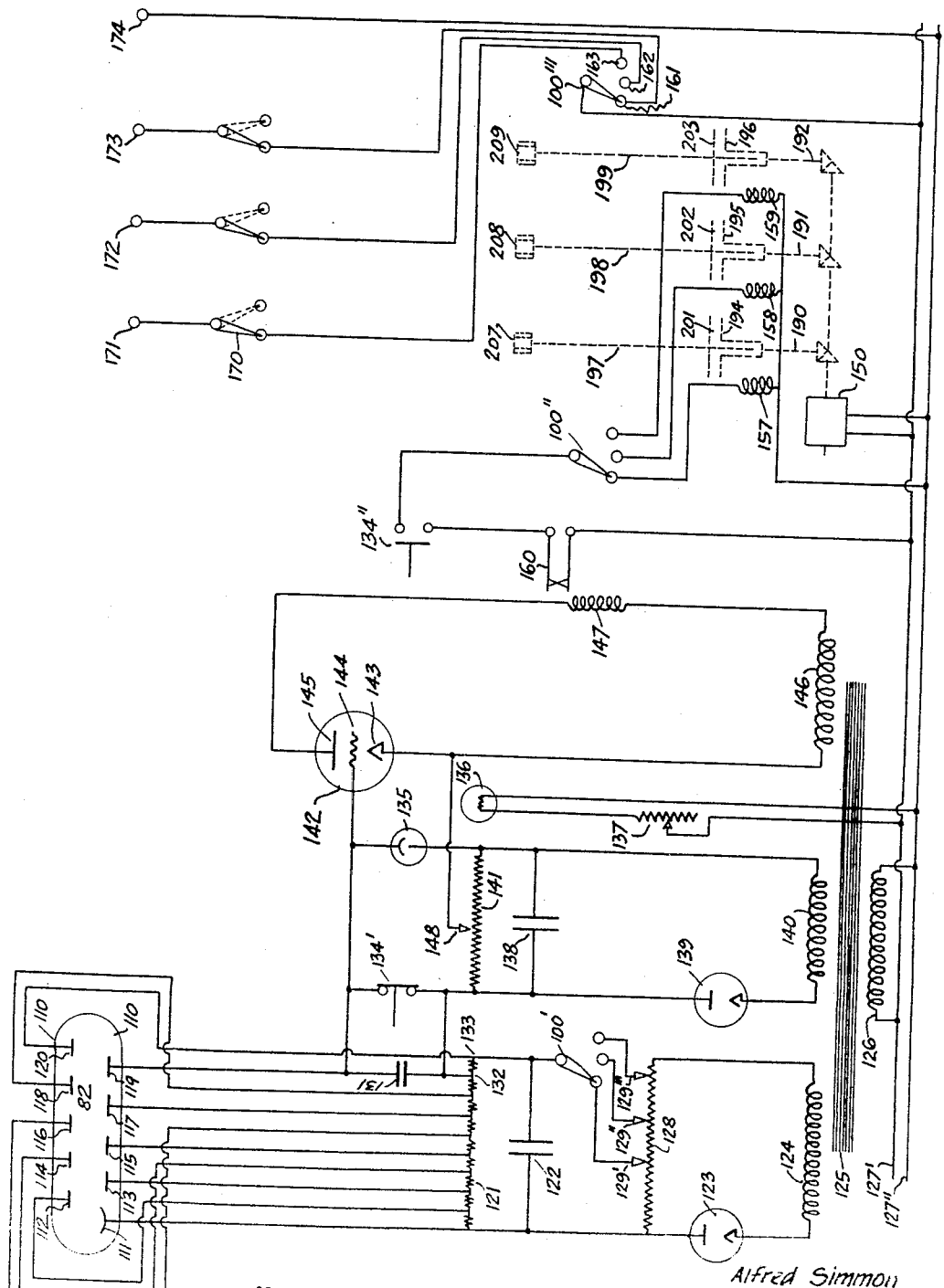
Fig. 8 is an electric circuit of the light measuring unit.

The light measuring circuit is shown in detail in the diagram in Fig. 8. In the interest of simplicity, current supplies for the filaments of the various rectifiers and thyratron tubes have been omitted. These filaments are in reality energized either by small filament transformers or by additional turns of wire wound on the iron core of the transformer which supplies the various circuits.

The entire circuit may be considered to consist of six parts, i. e.:

The circuit for the multiplier tube;
The first charging circuit for the condenser. The current in this circuit depends upon the light to which the multiplier tube is being exposed;
The second charging circuit for the condenser which is parallel to the first charging circuit and charges the condenser with a constant current independent of light conditions in the first circuit;
The thyratron-relay circuit comprising a thyratron as an element to indicate when the condenser has reached its critical voltage, and a relay in series with this thyratron;

The measuring circuit for the charging time of the condenser comprising a constant speed motor and a magnetic clutch controlled by the aforementioned relay;

The control circuit for the three color filter, as shown in Figs. 2 and 3.

*Multiplier circuit*

This circuit comprises a photoelectric cell of the electron multiplier type, a voltage divider and a source of direct current. The multiplier tube 82 comprises a transparent glass vessel 110, a photo sensitive cathode 111, and a number of electrodes 112, 113, 114, 115, 116, 117, 118, 119 and 120. Cathode 111 is the most negative of all elements within the multiplier tube and a voltage of approximately 100 volts is impressed between this cathode and the next electrode 112 as well as between subsequent electrodes in such a way that the electrodes become increasingly more positive, electrode 120 being the most positive of all. In this manner the few electrons which are emitted from the photosensitive cathode upon exposure to light are attracted by the electrode 112 where they cause the emission of secondary electrons. The number of these secondary electrons is larger than the number of the primary electrons and the ability of the tube to "multiply" electrons is based on this fact. The secondary electrons emitted by electrode 112 are in turn attracted to the next electrode 113 where they cause the emission of still more tertiary electrons. This process is repeated in each stage so that finally a fairly heavy current flows between the last electrodes 119 and 120.

As can be noted from the circuit diagram, the cathode 111 and the various electrodes 112 to 120 are connected to corresponding taps of a voltage dividing resistance 121. The left side of this resistance which is connected to the cathode 111 must be of negative and the right side which is connected to the electrode 120 must be of positive polarity, and this voltage dividing resistance must be connected to a source of direct current which may, for example, be a battery. Merely as a preferred and convenient source of direct current, I have shown a condenser 122, a rectifying tube 123 and a transformer which consists of a secondary 124, iron core 125 and a primary 126 which is connected to a suitable power line 127' and 127". In order to be able to adjust the voltage impressed on condenser 122, I provide an additional voltage dividing resistance 128. Three sliding contacts 129', 129" and 129''' permit the adjustment of the voltage which will be impressed upon condenser 122. Which of the three contacts determines this voltage depends upon the position of the step switch 100'. This step switch is part of the switch 100 which is shown in Fig. 6 and which is actuated by a handwheel 130 visible in Figs. 6 and 1. By adjusting the position of the sliding contacts 129', 129" and 129''' and selecting one of these contacts by means of switch 100', the total voltage impressed upon the multiplier can be adjusted and thereby the light sensitivity of the device can be readily controlled. This is important because in one application of my device it is necessary to measure the intensity of light of different colors. The sensitivity of the photocell changes, unfortunately, quite widely as a function of the wave lengths of the impinging light, and by means of this arrangement the light sensitivity of the circuit can be adjusted so as to be substantially uniform for the three primary colors.

*First condenser charging circuit*

The condenser itself is shown as 131 and it is inserted into the last loop of the current supply of the multiplier tube. This last loop is formed by that part of the voltage divider which lies between points 132 and 133 and the respective connections between these two points and electrodes 120 and 119. The condenser is inserted into the wire which connects point 132 to electrode 119 rather than into the wire which connects point 123 to the electrode 120. In this manner the condenser receives the most convenient polarity condition which permits its subsequent connection to a thyratron tube which, in turn, indicates when this condenser becomes charged to a predetermined voltage. Parallel across this condenser is a push button controlled switch 134' which is normally closed, i. e., which normally keeps this condenser shortened so that it is completely discharged until this push button is depressed by the operator.

*Second charging circuit for condenser*

The second charging circuit is parallel to the first charging circuit and charges this condenser with a constant current, independent of the light conditions which prevail at the photo multiplier tube. It is, therefore, necessary to provide an element within this circuit which passes a constant current, and it must pass this constant current regardless of the fact that the condenser voltage itself rises during the charging process. A simple resistance is, therefore, unsuitable since it would not keep the charging current constant in spite of the rising condenser voltage. Under certain conditions a screen grid tube would fill this requirement since a screen grid tube in the proper circuit keeps its plate current substantially constant over a fairly wide range of plate voltages. As a preferred means of a constant current element, I use a second photoelectric cell illuminated by an independent lamp with a constant light output. It must be emphasized that this second photoelectric cell and this second lamp have no connection whatsoever with the light output of the printer, and that they merely serve as a convenient constant current element.

This circuit is shown as part of Fig. 8. The second photoelectric cell is called 135 and is illuminated by a small lamp 136. The light output of this lamp can be adjusted by a resistance 137, but once it has been adjusted to a suitable value it will be left there during the operation of the device. A suitable D. C. voltage is impressed through photocell 135 on the condenser 131. This voltage again may be derived from any suitable D. C. source, for example, a battery, and again as a matter of convenience, I am providing a condenser 138 which is charged through a rectifying tube 139 by the secondary coil 140 of a transformer. Rather than use a second transformer, this secondary coil 140 is arranged on the same iron core 125 serving already for the secondary coil 124 which energizes the photo multiplier circuit. A resistance 141 is arranged across terminals of condenser 138. The left side of condenser 138 and resistance 141 is of negative and the right side, of course, is of positive polarity.

*Thyratron-relay circuit*

The purpose of this circuit is to provide means to indicate when the voltage of condenser 131 has reached a predetermined critical value. It consists of a thyratron tube 142, with a cathode 143, a grid 144 and an anode 145. This thyratron is energized by alternating current derived from a secondary coil 146 which is preferably, but not necessarily, mounted on the same iron core 125 as the two other secondaries 124 and 140 described above. The plate circuit of the thyratron is completed by a relay coil 147 which is part of a relay to be described later. The grid of the thyratron is connected to the positive terminal of the condenser 131, and to complete the grid circuit the cathode 143 is connected to a sliding contact 148 of resistance 141. Thus the voltage of the thyratron grid 144 with respect to the cathode 143 consists of the voltage impressed upon the left part of resistance 141 and of the voltage impressed upon condenser 131. The two voltages are, as can be easily seen, of opposite polarity. A thyratron is usually non-conductive as long as its grid voltage with respect to the cathode is more negative than —2 volts, and it becomes current conducting as soon as the grid voltage is less than —2 volts negative with respect to the cathode. The result of this arrangement is that as soon as the condenser voltage is more than 2 volts larger than the voltage of the left half of resistance 141, the previously non-current conducting thyratron becomes current conducting, whereupon current begins to flow in relay coil 147.

*Charging time measuring circuit*

This circuit consists of a constant speed motor 150, preferably a synchronous motor, which drives, through a system of gears, three shafts 190, 191 and 192. Each shaft is connected to a clutch disc 194, 195 and 196 which cooperate with opposing discs 201, 202 and 203. These clutches are normally open, i. e., the extensions of shafts 190, 191 and 192 which are designated 197, 198 and 199 and which carry discs 201, 202 and 203 are normally stationary. The three clutches are actuated by three electromagnets 157, 158 and 159. Which one of these three electromagnets is in the circuit depends upon the position of a triple switch 100''. This switch is mounted on the same shaft as the other triple switch 100' which is part of the circuit of the photo multiplier tube, and the two are thereby actuated in unison. In series with this switch is a normally open push button 134'' which is mechanically connected to 134' and a normally closed contact 160 which is energized by the aforementioned relay coil 147.

*Control circuit for three color filter*

The circuit is completed by a third triple switch 100''' also mounted on the same shaft as 100' and 100'', so that the three switches are actuated in unison. The center point of switch 100''' is connected to one end of the line, and the three contacts 161, 162 and 163 are connected to a three pole-double throw switch 170. In the position shown, 161, 162 and 163 are connected to terminals 171, 172 and 173. These three terminals, together with a direct connection of a fourth terminal 174 to the other side of the line, constitute the current supply for the electrically operated three color filter which is shown in Figs. 2, 3 and 4.

*Mechanical part of light measuring device*

This unit has already been shown schematically in Fig. 8 in connection with the circuit diagram.

Its actual construction and appearance is shown in detail in Figs. 9, 10, 11 and 12. It comprises the base 180 which supports all other components. A constant speed motor 150 drives, by means of worm 181 and worm gear 182, a transverse shaft 183. Mounted on this transverse shaft are worms 184, 185 and 186 which, respectively, engage worm gears 187, 188 and 189. These worm gears are mounted on hollow shafts 190, 191 and 192, respectively. These hollow shafts run in ball bearings and carry at their respective front ends clutch discs 194, 195 and 196. Rotatably mounted within the hollow shafts 190, 191, 192 are solid shafts 197, 198 and 199. These shafts carry at the front end smaller clutch discs 201, 202, 203, respectively, which are adapted to be engaged by the larger clutch discs 194, 195 and 196. For this purpose, sufficient axial play is permitted for the shafts 197, 198 and 199 so that by a small axial movement the two parts of the clutch can come in contact. Also fastened to the three solid shafts are three ratchet gears 204, 205 and 206 and three small pinions 207, 208 and 209. By means of these pinions the movements of the three shafts 197, 198 and 199 are transmitted to the computing unit, to be described later. The cylindrical parts connecting the clutch discs 201, 202 and 203 to the ratchet gears 204, 205 and 206, respectively, are constricted at one point, forming a narrow cylindrical groove. Into this cylindrical groove fit levers 210, 211 and 212. The shape of these levers can be best seen in Fig. 11. They are supported on their right side by pivots 213, 214 and 215, and their left ends 216, 217 and 218 are, respectively, connected to solenoids 157, 158 and 159 or, more accurately, to their armatures 224, 225 and 226. The electrical connection of these solenoids have already been shown in the diagram in Fig. 8. The levers 210, 211 and 212 have projections 220, 221 and 222 which fit into the aforementioned grooves between the respective clutch discs and ratchet gears. Whenever one of the solenoids is energized, it will, of course, attract its armature, thereby rotating the corresponding lever 210, 211 or 212 slightly and forcing the entire assembly attached to one of the solid shafts 197, 198 and 199 to perform a small axial movement. During operation the constant speed motor 150 revolves constantly thereby driving the three worm gears 187, 188 and 189 and the connected clutch discs 194, 195 and 196. The respective opposite clutch discs 201, 202 and 203, however, are ordinarily not in contact with them and thereby these clutch discs, as well as all the elements connected to the solid shafts 197, 198 and 199, are ordinarily stationary and not rotating. However, as soon as one of the solenoids 157, 158 or 159 becomes energized, it will attract its armature thereby swiveling lever 210, for example, bringing clutch disc 201 in contact with clutch disc 194 whereupon shaft 197 begins to rotate. As soon as the solenoid is deenergized, a spring, not shown, will separate the two clutch discs, whereupon the solid shafts and all elements connected to them will cease to rotate.

The rotary movement of shafts 197, 198 and 199 with the associated pinions 207, 208 and 209 must be limited to less than 360°. This can, for example, be done by attaching a small projection to these shafts which cooperates with stop pins or the like attached to the stationary support for said shaft. It is, however, easier to limit the length of this movement, not at the shafts themselves, but at the corresponding parts of the computing device which are in operative connection with the pinions. No movement limiting devices have, therefore, been shown in Fig. 9.

Special provisions must be made to reset the shafts 197, 198 and 199 after they have been actuated in the manner described above, so that for the next set of measurements they again start from zero. This resetting mechanism is shown in Fig. 12. The ratchet gears 204, 205 and 206 are again shown. They are in operative contact with ratchet levers 621, 622 and 623. The ratchet gears are rotating, when energized through the clutches, in a counter-clockwise position. As soon as a clutch is deenergized, one of the shafts will, of course, come to rest and remain there until the operator sees fit to reset the three movements. For this purpose, the upper ends of ratchet levers 621, 622 and 623 are connected by a common bar 625. The right end 626 of this bar protrudes through a slot in the housing of the main unit. Small torsion springs 227, 228 and 229 are attached to the three ratchet gears. These torsion springs tend to rotate the ratchet gears in a clockwise position, and it will be clear that during rotation of the ratchet gears by the clutches these torsion springs will be more or less tensioned. Resetting is, therefore, simply achieved by the operator by pressing the right end 626 of bar 625 in the direction of the arrow, i. e., from right to left. This will disengage ratchet levers 621, 622 and 623 from contact with their respective ratchet gears 204, 205 and 206, whereupon the torsion springs 227, 228 and 229 will reset the ratchet gears and thereby all elements mounted on the solid shafts 197, 198 and 199.

*Timer*

Depending upon the method which is being used and which will be described later, either a triple or a single timer is used in connection with the object of this invention. The construction of these timers does not depart from conventional practice, i. e., a movable element is made to travel with a constant speed for a predetermined and adjustable length of travel, at the beginning of its stroke starting, and at the end of its stroke terminating, the exposure time, usually by switching the lamp within the printer on and off. A unit very similar to the one shown in Fig. 9 could, for example, very well be used, but for reasons of economy, I prefer to use individual small synchronous motors of the type commercially available for clock works or the like. These motors are built with a speed reducing gear train of any desired ratio and with a magnetically operated gear shift which automatically engages and disengages the gear train when the motor is energized and deenergized. The drive shaft is then free to be returned to the starting position by suitable means such as by a spring or by gravity. Motors of this type are shown in Figs. 14, 15 and 17.

As shown in Fig. 14 a baseplate 240 made from insulating material is attached by means of studs 241 to the base 90 which has already been shown in Fig. 7. Mounted on the base 240 are three synchronous clockwork motors 242, 243 and 244. The shaft of each motor carries an arm 245, 246 and 247. These arms are biased by springs 245', 246' and 247' in a counter-clockwise direction, but are prevented to move in that direction by pins 250, 251, and 252, so that the arms assume the positions shown in Fig. 15. The three pins 250, 251 and 252 are, respectively, mounted on other arms 250', 251' and 252', which are attached to shafts 255, 256 and 257. These shafts, in turn, can be rotated by the operator by means of handwheels 91', 92' and 93', already shown in Figs. 1 and 7, and are supported in bearings fastened in the main base 90. Means must be provided to prevent these shafts from rotating unless the operator so desires. For this reason, gears 260, 261 and 262 are provided, which cooperate with spring biased steel balls 264 shown in Figs. 14 and 16. These steel balls have, of course, the tendency to be seated between the teeth of the respective gears and, therefore, keep the gears and therewith the arms 250', 251' and 252' with their respective pins 250, 251 and 252 in the position in which they were set by the operator by means of handwheels 91', 92' and 93'. As soon as one of the motors is energized, for example, motor 242, the arm carried by it, 245, will move in a clockwise direction against the tension of spring 245'. This rotation will continue until arm 245 comes in contact with a stop pin 270, or in the case of the other motors, 271 and 272. The stop pin is not merely a mechanical element stopping the movement of the arm, but also has electrical connections which will be described in the next paragraph. Attached to shafts 255, 256 and 257 are three additional spur gears 295, 296 and 297. It is the purpose of these gears to transmit the position of these shafts to cooperating parts of the computing unit to be described later, i. e., by means of those gears the chosen exposure times are fed into the computing unit.

The electrical connections of this timer are shown in Fig. 13. Associated with each motor are two relays, one with two normally open, and one with one normally closed contact. For example, associated with motors 242, on the left side of the diagram in Fig. 13, is a relay with a coil 280 and two normally open contacts 281 and 282. The coil of the other relay is called 284 and its normally closed contact is 285. Thus motor 242 is connected in parallel to relay coil 280 and both are in series with contacts 281 and 285. Since 281 is normally open, the motor is deenergized and not revolving. The push button 290, however, can by means of step switch 99', actuated by handwheel 599, be connected in parallel to the normally open contact 281. If now the operator depresses push button 290 momentarily a circuit will be established, energizing relay coil 280 and starting the rotation of motor 242. As soon as relay coil 280 becomes energized it will close the two normally open contacts 281 and 282. The closing of 281 causes a continuous energy supply to motor 242 and relay coil 280 even after the operator ceases to depress push button 290. The closing of normally open contact 282 causes a circuit to be established which terminates in two binding posts 291 and 292 in turn connected to the lamp of the printer by means of a flexible cable. The rotation of motor 242 continues until arm 205, which rotates in a clockwise direction, comes in contact with stop pin 270. This stop pin not only physically prevents further movement of arm 245 but it also establishes an electrical connection energizing coil 284 of the second relay, whereupon normally closed contact 285 opens, interrupting the circuit for both the motor 242 and the relay coil 280. The motor shaft with arm 245 now returns to its original position, moved by biasing spring 245'. At the same time, the two contacts 281 and 282 return to their normally open condition. Contact 281, now open, interrupts the flow of current to 280 and 242 even after 285 returns to its normally closed position. The opening of contact 282 interrupts the circuit by which binding posts 291 and 292 and thereby the lamp of the printer were energized, thereby terminating the exposure. It will be noted that depending upon the position of step switch 99', contact 290 will either energize the motor 242 as shown in Fig. 13 or one of the two other motors 243 and 244. This step switch 99' is mechanically connected with a second step switch 99" shown on the right side of Fig. 13. 99" controls, in a manner already shown in Fig. 8, the supply of current to four binding posts 171, 172, 173 and 174 to which the electrically controlled three color filter is connected. As will be described later, the three pole double throw switch 170 either makes the 3-step switch 100''', Fig. 8, or the 3-step switch 99", Fig. 13, the controlling factor for this circuit, depending upon whether the unit is set for measuring or for exposure.

An alternate construction of the time switch is shown in Figs. 17 and 18. This type of time switch will be used in one of the methods to make color prints which comprises the use of substantially white light in a single exposure. For this purpose only one time switch is needed which is in all details precisely alike to the three shown in Figs. 14, 15 and 16. This switch is mounted in the center of the base plate 90 and terminates in a shaft 299, to which the handwheel 92' is attached which, in this case, takes the place of the former three handwheels 91', 92' and 93'. In the places to the right and left, respectively, where the two other time switches were shown in Fig. 14, shafts 300 and 301 are mounted. Means must be provided to synchronize the rotary movements of shafts 299, 300 and 301, i. e., a rotary movement of handwheel 92' shall cause the same rotary movement of all three shafts. This can be done, of course, in many mechanical ways and merely, as an example, I have shown three sprocket wheels 299', 300' and 301' which are tied together by means of a chain 302. Gears 305, 306 and 307 are again mounted on the three shafts 299, 300 and 301, and it is again the purpose of these gears to connect the three shafts to the respective cooperating parts of the computing unit to be described later.

*Computing device*

The computing device consists of three principal parts. In the first part, the light intensity in foot-candles is multiplied by the exposure time in seconds, and this is done three times for the three respective primary colors. Thereby a set of three foot-candle-second values is obtained for each measured point of the image. In the second part of the computing device these three foot-candle-second values are added up to a total exposure value, and in the third part the respective foot-candle-second values of two colors are divided by the total sum of all three foot-candle-second values i. e., the color percentages of two primary colors are computed.

*Device to compute foot-candle-seconds*

The light intensities in foot-candles, as measured by the light measuring unit described above, and the exposure times in seconds as determined by the respective position of the timers described in the preceding paragraph, are multiplied in this unit so that for each selected point of the image a set of three foot-candle-second values is obtained.

This can be done by the application of a large variety of computing devices, but in practice I prefer to use a mechanized and motorized nomograph of a design fully disclosed in my copending application No. 713,610. The basic mathematical relations which govern the design of this computer are shown in a diagram of Fig. 19. This diagram pertains not merely to the computing device now under discussion, but also to subsequent ones by means of which other computing operations can be performed which will be explained later. The computing devices described in the present paragraph are shown in Fig. 19 as the three lowest nomographs. These three lowest nomographs are alike, but perform the function of computing the foot-candle-seconds for three different primary colors, respectively, and it will, therefore, be sufficient to describe only one for which purpose I have chosen the left one.

A nomograph comprises basically three graduated scales showing the numerical values of three variables, respectively. These scales are so arranged that a straight line intersecting them always coordinates three particular values of the three variables which satisfy an equation for which the nomograph was prepared. Referring to the left lower nomograph shown in Fig. 19, I have a left vertical scale calibrated in seconds, denoting exposure times, a right vertical scale calibrated in foot-candle-seconds and a horizontal scale calibrated in decimal fractions ranging from 0 to 1. The significance of these fractions will be explained below. All scales have uniformly spaced divisions. A straight line intersects all three scales. As can be seen, point 310 is the intersection of the first vertical and of the horizontal scale, point 312 is the intersection of the second vertical and of the horizontal scale, and points 313, 311 and 314 are the points of intersection of said straight line and the first vertical, the horizontal and the second vertical scale, respectively. I shall call:

$$a = 310\text{--}313$$
$$x = 310\text{--}311$$
$$s = 310\text{--}312$$
$$s - x = 311\text{--}312$$
$$b = 312\text{--}314$$

It can easily be seen that triangles 311, 310 and 313, and 311, 312 and 314 are similar, and that consequently I have the proportion:

$$\frac{a}{x} = \frac{b}{s-x}$$

This can then be resolved to read:

$$b = a\left(\frac{s}{x} - 1\right)$$

This formula can be compared to the formula derived in the paragraph describing the light intensity measuring circuit which read:

$$\frac{K}{i_2}(Lt) = t\left(\frac{T_0}{T} - 1\right)$$

It will at once become obvious that the two formulas are very similar and that they can be made identical by making $$b = \frac{K}{i_2}(tL)$$

$$a = t$$

$$\frac{T}{T_0} = \frac{x}{s}$$

In other words, there is the extremely simple relation that the first vertical scale expresses exposure times directly in seconds, that the second vertical scale expresses foot-candle-seconds provided the proportionality factor $$\frac{K}{i_2}$$

is taken in consideration, and that the horizontal scale directly expresses the fraction of $$\frac{T}{T_0}$$

The distance 310-311 becomes thereby directly proportional to the condenser charging time of the light measuring circuit or, since this condenser charging time was expressed in the length of travel of a moving element, this moving element can be used directly to adjust the position of the corresponding element in the computor.

The actual execution of a computing device of this character is shown in Fig. 20. Each mechanized nomograph comprises three sliding elements adapted to be moved in straight lines. One of these elements carries a pivoted straight arm and the two other elements have projections adapted to come in contact with said arm. Means usually comprising at least one servo motor are used to keep those two projections at all times in simultaneous contact with the pivoted straight arm. Element 320 moves in accordance with the exposure time as set by the operator. In order to accomplish this, its left side is equipped with teeth which form a rack, and this rack is in operative engagement with the gear 295 forming part of the extreme left time switch shown in Fig. 14. Element 320 is supported, in addition to the gear 295, by grooved rollers 321 and 322 also shown in Fig. 21. At the upper end it carries a pivoted arm 323. This arm is biased by a spring which, however, is, in the interest of simplicity, not shown, and which tends to rotate said arm in a counter-clockwise direction. Element 325 moves in accordance with the charging time of the condenser 131 of the light measuring circuit shown in Fig. 8. For this purpose its upper edge is equipped with teeth which form a rack and are in operative contact with pinion 207 of the mechanical part of the light measuring device shown in Fig. 9. This pinion is driven for the duration of the charging period of condenser 131 by a constant speed motor 150 and, therefore, its angle of rotation is directly proportional to the charging time of this condenser. Element 325 travels from left to right, and the distance of this travel becomes also directly proportional to the charging time of condenser 131. In addition to the pinion 207, grooved rollers 326 support element 325. A projection 327 is attached to 325, and this projection is adapted to come in contact with the upper straight surface of arm 323.

Figure 22:
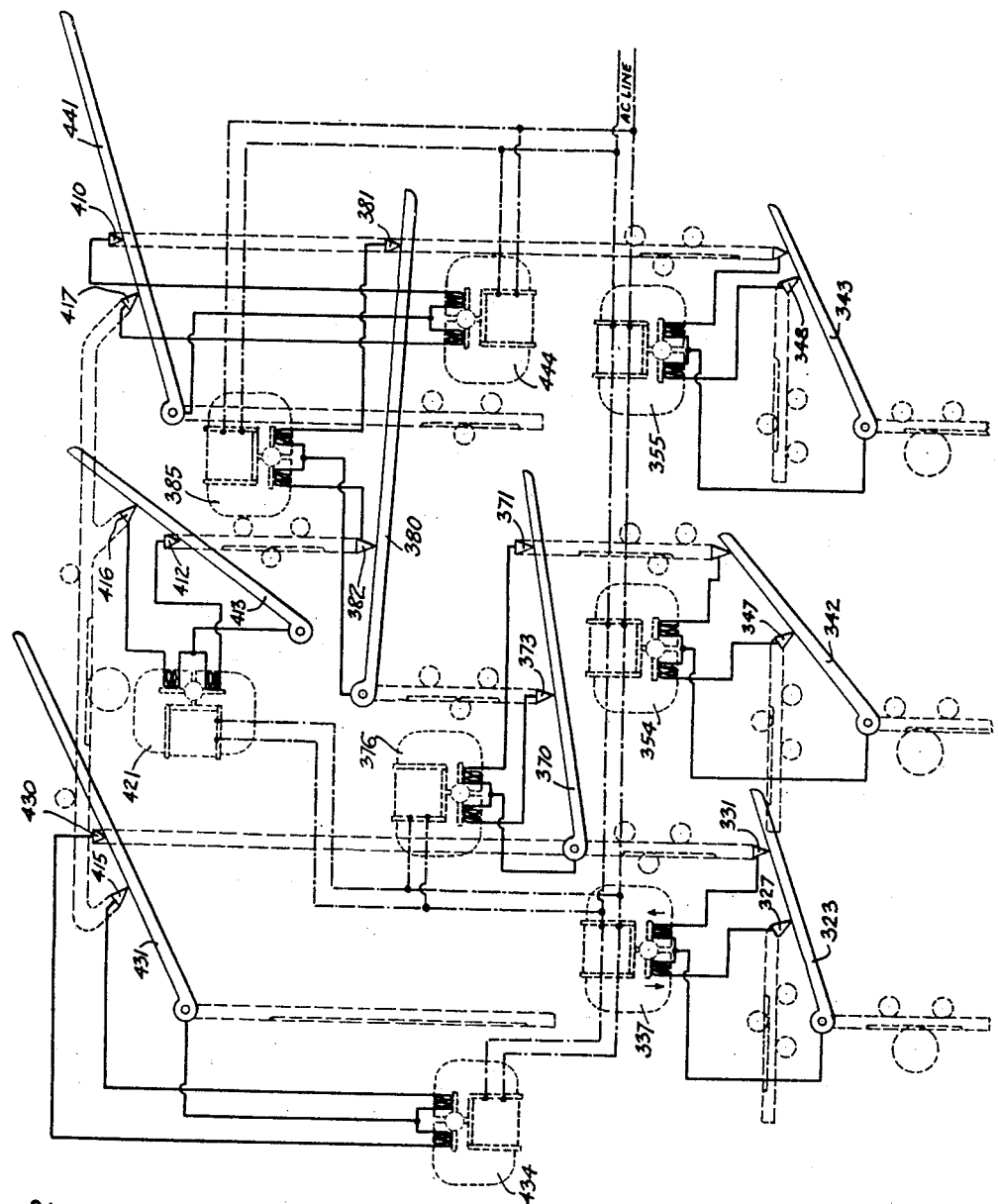

It will be clear that the respective positions of elements 320 and 325, together with the fact that pivoted arm 323 is spring biased in a counter-clockwise direction, determine the position of arm 323. The position of this arm, in turn, is made to determine the position of a third sliding element 330 which has a projection 331 also adapted to be in contact with the upper straight surface of the pivoted arm 323. The means employed to assure simultaneous contact of projections 327 and 331 with arm 323 are as follows: The element 330 is supported by two grooved rollers 332 and by a pinion 333. The teeth of this pinion are engaged to corresponding teeth on the left edge of element 330 again forming a gear rack. Referring to Fig. 21 it can be seen that pinion 333 is attached to shaft 334 which, at its lower end, carries a worm gear 335. This worm gear is engaged by a worm 336 in turn attached to the shaft of a motor 337. The motor 337 is a reversible alternating current motor known as a shading coil motor. It has a field coil permanently connected to a suitable source of alternating current, and it has two shading coils which cause this motor to rotate in one or the other direction, depending upon which of the shading coil circuits is closed. If the circuits of both shading coils are closed simultaneously, the motor remains stationary. A motor of this type lends itself very easily to be used in an extremely simple manner as a servomotor assuring the simultaneous contact of projections 327 and 331 with pivoted arm 323. This is shown in the wiring diagram of Fig. 22 showing the connections not only for this particular servomotor, but also for the other servomotors connected with the entire computing system of the object of this invention. Motor 337 is the lower left one and its shading coils are connected in such a way that one end of one shading coil is connected to one end of the other shading coil, and both of them are conductively connected to the pivoted lever 323, for example, by means of a flexible cable. The other ends of the two shading coils are then, respectively, connected to the projections 327 and 331, again by flexible cables or the like. The lever and the projections are, of course, made from current conducting material, preferably silver plated brass or the like, and these three elements are electrically insulated from all other elements of the computing device. When both projections are in contact with lever 323, both shading coil circuits are closed and the motor 337, therefore, remains stationary. Failure of one projection to make contact with said lever opens one shading coil circuit and the motor 337 thereupon rotates in a direction determined by the other shading coil circuit which remains closed. Failure of the other projection to make contact with said lever will, in like manner, cause the motor to rotate in the opposite direction. The direction of rotation of the motor with reference to either shading coil circuit must, of course, be chosen in such a way that the system always tends to return to the stationary condition in which the lever 323 is simultaneously in contact with both projections 327 and 331. This system of a mechanized and motorized nomograph comprising three sliding elements, one of them carrying a pivoted arm, the others carrying projections and means including a servomotor of the type described, to insure simultaneous contact of said arm and said projections, has been consistently applied to solve all computing problems of this color printing device. The entire theory of computing devices based on this conception has been fully disclosed in my copending application No. 713,610, and I wish to refer to this disclosure for more complete details.

For example, the computing device just described in detail serves the purpose of computing the foot-candle-seconds of one primary color. In like manner, immediately to the right of this computing device are two other computing devices of identical construction which serve the purpose of computing the number of foot-candle-seconds for the two other primary colors. They comprise moving elements 340 and 341 associated with gears 296 and 297. These elements are being set in accordance with the chosen exposure times for these primary colors. Elements 340 and 341 carry, respectively, pivoted arms 342 and 343

Sliding elements 345 and 346, respectively, are in operative contact with pinions 208 and 209 of the mechanical part of the light measuring device. They carry projections 347 and 348. Sliding elements 350 and 351 assume positions in accordance with the foot-candle-second values of these two other primary colors. The position of these elements is determined in a manner identical to that which determines the position of the corresponding element 330, i. e., they are in operative contact with gears 352 and 353 which are, in turn, through worms and worm gears actuated by motors 354 and 355. The electrical connections of these motors are shown in Fig. 22 and are in all respects identical to the ones of motor 337.

*Device to compute sum of foot-candle-seconds*

For reasons which will be noted in a later paragraph, it is necessary to compute the sum of all three foot-candle-second values for each selected point of the image. This again is done by a system of mechanized and motorized nomographs. It is known that a nomograph can be used to compute sums of two unknown magnitudes if it comprises three uniformly divided straight and parallel scales, two of which represent the two known and the third representing the unknown magnitude. Referring to Fig. 19, scales 360 and 361 are two scales representing foot-candle-second values for two primary colors. A third scale 362 is arranged half-way between them and a straight line 363 which connects the two known values on scales 360 and 361, respectively, will intersect scale 362 at a point which represents the sum of the two magnitudes shown on the scales 360 and 361. It will be noted that one inch on scale 362 contains twice as many divisions as one inch on scales 360 or 361. In like manner, values shown on scales 365, straight above 362, and 366, respectively, can be added up by means of a third scale 367 and a straight line 368. Since one inch of scale 365 has twice as many divisions as one inch of scale 366, one inch on scale 367 has three times as many divisions as one inch on scale 366, and the distance $n$ between scales 365 and 367 is ½ of the distance $m$ between scales 367 and 366. For a full explanation of these distances and proportions, I wish again to refer to my copending application No. 713,610 where this particular case has been treated in detail.

As can be seen from Fig. 19, the nomograph comprising scales 360, 362 and 361 adds up the foot-candle-second values for two primary colors, and the nomograph comprising the scales 365, 367 and 366 adds the foot-candle-second value of the third color to the sum of the foot-candle-seconds of the two other colors so that scale 367 represents the sum of the foot-candle-second values of all three colors.

In Fig. 20 the geometric conditions and proportions shown in Fig. 19 are translated into actual structural elements. Element 330 carries a pivoted arm 370 which again is biased counter-clockwise and which is connected to the common connection of both shading coils of motor 376. The other ends of these shading coils are connected, respectively, to projections 373 and 371. In this manner, element 372 assumes the position in which projections 373 and 371 are in simultaneous contact with pivoted arm 370, and this position represents the sum of the foot-candle-second values as represented by the respective positions of elements 330 and 350.

The upper end of 372 carries another pivoted arm 380 which is again biased and tends to rotate in a counter-clockwise direction. This arm is in simultaneous contact with a projection 381 attached to a sliding element 351, and with another projection 382 attached to part 383. This element 383 is in the usual manner moved by a gear 384 which is, in turn, through a worm gear, actuated by a motor 385. In this manner, both projections 382 and 381 are always kept in simultaneous contact with arm 380. As we have seen, element 372 represents by its position the sum of two foot-candle-second values. The position of element 351, as we have seen, depends upon the third foot-candle-second value and, consequently, the position of the last element 383 is in accordance with the sum of all three foot-candle-second values.

*Device to compute color percentages*

The last computing operation that I perform, is to divide for two primary colors the respective number of foot-candle-seconds by the sum of the foot-candle-seconds of all three primary colors. For this purpose the uniformly divided scale on which said sum is shown is first transformed into a projected scale with non-uniformly spaced divisions. The total sum of all three foot-candle-second values, as represented on this non-uniformly divided projected scale is then fed together with one or the other of the originally computed foot-candle-second values for two respective primary colors into two final nomographs where the required division is performed.

Referring to Fig. 19, the foot-candle-seconds on scale 367 represent the sum of the three foot-candle-second values for all three primary colors for a selected point of the image. In the interest of brevity, this sum will be called S, or $$S = tL_{blue} + tL_{green} + tL_{red}$$

This value is first transferred to a scale 400 which is identical to scale 367. From a point 401, straight lines are then drawn to the various points of this scale, and a second larger and parallel scale 402 is obtained in this manner. Scale 402 still has uniformly spaced divisions and is merely a linearly magnified rendition of scale 400. S is thereby changed into S″ having a different physical length, but the same numerical value. A third scale 403 is then drawn, originating from the zero point of scale 402 and embracing a certain angle therewith. In this particular case, this angle is 90°. Straight lines drawn from point 401 through the various divisions of scale 402 intersect scale 403 at corresponding points which will have the same numerical values, but different distances from the zero point as compared to corresponding points on scale 402. A scale obtained in this manner has non-uniformly spaced divisions and is called a projected scale. The distance on this scale which corresponds numerically to the values S and S″ is called S′. This value will, in turn, be fed into the two nomographs which perform the dividing computation. For a fuller explanation of the theory of scale transformation diagrams and mechanisms of this type, and in particular for means to compute the precise proportion of the various parts including the location of point 401, I refer to my copending application No. 713,610.

The value S′ is transferred from scale 403 parallel to itself to corresponding and identical scales 404 and 405 which are horizontally arranged as shown on the upper left and right corners of Fig. 19. In like manner, the foot-candle-second values for two primary colors, for example, blue and red, are transferred from their respective scales, for example, 360, parallel to themselves to vertical scales 409 and 406. The two nomographs are completed by two additional vertical scales 407 and 408 which are uniformly divided in fractions ranging from 0–1 or in percent ranging from 0–100. These fractions represent the numerical values of the desired quotients $$\frac{tL_{blue}}{S}$$

and $$\frac{tL_{red}}{S}$$

Straight lines intersecting scales 409, 404 and 407, or 406, 405 and 408, respectively, coordinate corresponding values of each set of three scales, and the required quotients can then be seen on scales 407 and 408. Again, for the theoretical foundation of the last two dividing nomographs, I wish to refer to my copending application No. 713,610.

The physical appearance of a computing device built accordingly is shown in Fig. 20. Element 383 carries at its upper end an additional projection 412 adapted to come in contact with a pivoted arm 413. This arm is again biased by a spring which is not shown and tends to rotate in a counterclockwise direction on pivot 401. An element 414 which has three projections 415, 416 and 417 is adapted to slide in a horizontal direction, supported by two grooved rollers 418 and 419 and a gear 420. This gear 420 is in the usual manner driven by a motor 421 of the same shading coil type as described before, and these coils are connected in the usual manner, i. e., one end of one shading coil is connected to the end of the other and both are connected, for example, by a flexible cable, to arm 413. The other ends of the two shading coils are then, respectively, connected to projections 412 and 416, and the direction of rotation of the motor 421 with respect to either shading coil is so chosen that it always tends to restore the stationary condition shown in Fig. 20, in which both projections 412 and 416 are in simultaneous contact with arm 413.

Element 330 which represents the foot-candle-seconds of the blue primary color carries at its upper end an insulated projection 430. A pivoted arm 431 is adapted to be in simultaneous contact with both projections 415 and 430. This arm is supported by a sliding element 432 which, in the usual manner by means of a gear 433 and a motor 434, is raised or lowered. The element 432, as can be explained with the aid of the diagram in Fig. 19 represents by its position the quotient $$\frac{tL_{blue}}{S}$$

In like manner, the element 351 representing by its position the "red" foot-candle-seconds carries at its extreme upper end a projection 440. The pivoted arm 441 is adapted to be in simultaneous contact with projections 417 and 440. This arm is supported by a sliding element 442 which again is, in the usual manner by means of a gear 443 and a motor 444, raised or lowered until arm 441 is in simultaneous contact with projections 417 and 440. Element 442 represents then by its position the desired quotient $$\frac{tL_{red}}{S}$$

The construction of the computing device as shown in Fig. 20 is not affected by the choice of the time switch which may be built as a triple timer according to Fig. 14 or as a single timer according to Fig. 17. If the triple timer according to Fig. 14 is chosen, the vertical levels of the three elements 320, 340 and 341, representing exposure times of a generally different magnitude, usually are correspondingly different. If a single timer according to Fig. 17 is chosen, these three exposure times will be identical and, consequently, elements 320, 340 and 341 will at all times occupy positions at the same vertical level. The significance of these two respective arrangements will be discussed in detail later under "Methods."

*Test print*

Sensitized material for ordinary black and white photography is generally tested by making a so-called stepwedge print. By a stepwedge print, one usually understands an elongated strip of such material divided into a fairly large number of small rectangular areas which are subjected in some manner to a steadily increasing or decreasing exposure to white light. The relative densities obtained by this method enables one to judge the properties of this material.

The application of this principle to color print material is not quite simple since it is not sufficient to make, for example, three stepwedge prints with the three primary colors, respectively, because for really complete information it is necessary to provide some means by which one can obtain areas which are exposed to any conceivable combination of three respective exposure times for the three primary colors. In order to do this, I replace in the preferred type of this test print each rectangular area of a stepwedge print by a triangle which is exposed non-uniformly to light producing the three primary colors respectively. Each corner of this triangle receives full exposure to light producing one color, the side of the triangle opposite this corner receives no exposure to light producing this particular color, and intermediate points receive intermediate exposures which are timed in proportion to the distance of each point from said side of the triangle. A triangle exposed in this manner will show the three corners in bright colors, usually red, blue and green. The luminosity of these colors diminishes gradually as one approaches the center, and the center should show, with a well-balanced material, a neutral gray. If the exposure times to which each point of the triangle has been exposed for each color increases in linear proportion from each side of the triangle to its opposite corner, the sum of the three exposure times will be constant over the entire area of the triangle. An infinite number of such triangles is conceivable, depending upon the magnitude of said sum. In reality, of course, one has to compromise and be satisfied with a relatively small number of triangles, but even a small number will give adequate information about the behavior of the color print material if the sum of the three exposure times for each triangle follows a suitable, usually geometric, progression, and if thereby a sufficient range of exposure times is covered.

A schematic diagram of the preferred form of this test print is shown in Fig. 32. A group of six triangles is arranged symmetrically around a common center. The corners of each triangle show the primary colors, i. e., for example, all upper corners are green, all lower right hand corners are red, and all lower left hand are blue. Within the triangle the colors lose their luminosity more and more until in the center of the triangle a neutral gray prevails, under the assumption, of course, that the color print material is well balanced; otherwise, the region of neutral gray will not be in the middle of the triangular area but shifted towards one of the corners. Since the six triangles are receiving widely different exposure times, their relative density will, of course, vary considerably. For example, the first triangle will appear almost black, the corners merely showing traces of very dark green, red and blue colors. For subsequent triangles, the colors will become lighter, and perhaps the third or fourth triangle will show the most luminous colors. From then on, the colors will fade out and, instead of a black or gray area in the middle, a white spot will appear. The last triangle will be almost entirely white with merely a weak tint of green, red and blue in the respective corners.

These test prints are best made with the aid of mechanical devices designed for this purpose, and two suitable devices have been disclosed in copending applications No. 690,687 and 690,688 of which I am a co-inventor.

On this test print—and that is the basic idea on which this invention is based—I now locate an area and/or a point which has received the same combination of exposures, in foot-candle-seconds of light producing the three primary colors, respectively, as a selected point of the image is going to receive according to the measured light intensities for said primary colors, and the chosen exposure times. This process can be subdivided into two parts, i. e., I first select one of the triangles which has received the same total exposure as that selected point on the easel is going to receive, and I then trace within this triangle the point which has received the same percentages of the three primary colors, respectively; in practice, two of the percentages determine the position of any point within a triangle since the third percentage will obviously be automatically 100% minus the two other percentages. The means to perform these two steps will be discussed in the next paragraphs.

*Triangle selector*

This device consists of two principal parts, a switch which is actuated in accordance with the sum of the three foot-candle-second values as delivered by the computing device and a rotatable and indexing support for the test print the movement of which is controlled electrically by the action of said switch.

*Triangle selector switch*

This switch is shown in Figs. 23, 24 and 25. It consists of two switch assemblies mounted by means of studs 461 upon the baseplate 90 which supports the computing mechanism. The two switch assemblies are driven by a common shaft 462 carrying a worm gear 463, driven by motor 421, and at its left end, Fig. 23, the spur gear 420 which, in turn, is in operative engagement with element 414. Referring back to Figs. 20 and 19, it can be seen that element 414 moves in accordance with the sum of the three foot-candle-second values, but it does so in accordance with a projected scale with non-uniformly spaced divisions. The advantage of having the switches in operative engagement with element 414 rather than with element 383 which also moves in accordance with said sum, but in accordance with a scale with uniformly spaced values, is that in this manner the increment in total foot-candle-second values from one step of the switch to the next is non-uniform or, more specifically, this increment itself increases substantially in a geometric progression. This is obviously desirable since a geometric progression of exposure values is much better adapted to render information on the behavior of photographic material, and since in this manner obviously a much wider range can be covered.

The shaft on which the switches are mounted consists of three sections, the aforementioned 462 which carries the two gears, section 462' and section 462''. These three sections are mechanically connected, but electrically insulated from each other by discs made from insulating material 465 and 466. The two switches are mounted on baseplates made from insulated material 467 and 468.

An outstanding characteristic of both switches is that they change their electrical connections in accordance with the direction in which they are rotated by the computing device. This is achieved by a body carrying the main sliding contacts of the switch mounted loosely on the shaft and driven by an element fixedly attached to said shaft. The loosely mounted contact assembly has two projections, and either one or the other of these projections comes in mechanical and electrical contact with the element which is fixedly attached to the switch shaft and which drives the loose element in one direction or the other.

The first switch changes the direction of a motor adapted to rotate the test print support to be described later, and the second switch actuates certain electrically operated catches which, together with a projection on the rotating test print support, form an escapement mechanism by means of which a step to step movement of the rotating indexing test print support is achieved.

The first switch assembly is the right one shown in Fig. 23 and is also shown in Fig. 25. Fixedly attached to shaft 462'' is part 470 made from metal. This part carries a sliding contact 471 and a projection 472. Loosely mounted on that shaft is part 473 made from insulating material. This part carries current conducting projections 474 and 475, as well as sliding contacts 476 and 477. Contact 476 is conductively connected to projection 475, and contact 477 is conductively connected to projection 474. The projection 472 fits with some play between the projections 474 and 475 and, consequently, when shaft 462'' is moved in a clockwise direction, part 470 pushes part 473 by physical contact between projections 472 and 474 and, at the same time, electrical contact is established between contact 471 carried by 470, and contact 477 carried by 473. On the other hand, if shaft 462'' is moved in a counter-clockwise direction, physical and electrical contact is established between projections 472 and 475, and thereby contact 471 is electrically connected to contact 476.

Contacts 471, 476 and 477 slide, respectively, on current conducting rings 480, 481 and 482 mounted on insulating support plate 468.

The second switch assembly is the left one shown in Fig. 23 and also shown in Fig. 24. Fixedly attached to shaft 462' is part 490 made from metal. This part carries a sliding contact 491 and a projection 492. Loosely mounted on that shaft is part 493 made from insulating material. This part carries current conducting projections 494 and 495 as well as sliding contacts 496 and 497. Contact 496 is conductively connected to projection 495, and contact 497 is conductively connected to projection 494. The projection 492 fits with some play between the projections 494 and 495, and consequently when shaft 462' is moved in a clockwise direction, part 490 pushes part 493 by physical contact between projections 492 and 495 and, at the same time, electrical contact is thereby established between contact 491 carried by 490 and contact 496 carried by 493. On the other hand, if shaft 461' is moved in a counter-clockwise direction, physical and electrical contact is established between projections 492 and 494, and thereby contact 491 is electrically connected to contact 497. Contact 491 slides on a current conducting ring 500. The two contacts 496 and 497 slide on a number of current conducting segments 501, 502, 503, 504, 505 and 506.

*Support for test print*

Figure 27:
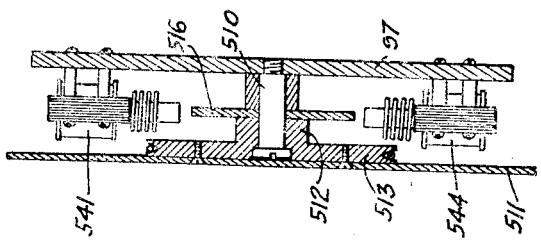
Figure 26:
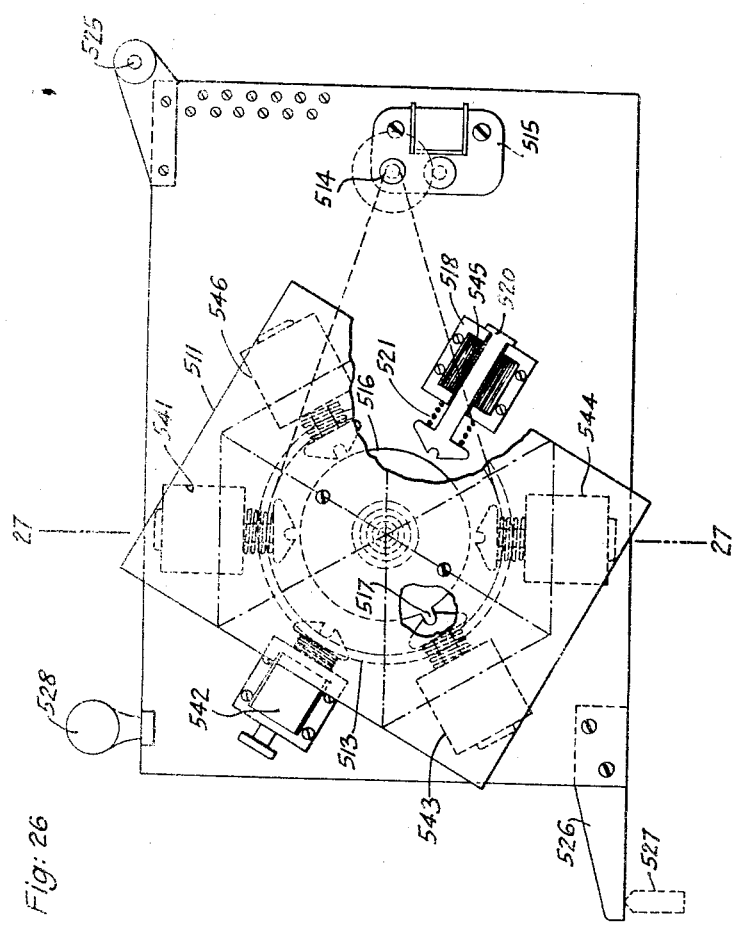

This unit is shown in Figs. 26 and 27. Its general location with respect to the other parts of the mechanism was schematically indicated in Fig. 7. It comprises a baseplate 97 carrying a stationary shaft 510. This shaft serves as a support for the test print holder comprising a rectangular plate 511 and a bearing 512. Means to fasten a sheet of color print material such as spring clips or the like are associated with plate 511 but are, in the interest of simplicity, not shown. Attached to bearing 512 is a fairly large pulley 513 which has a V groove machined on its outer circumference. This V groove accepts a flexible belt connecting pulley 511 to a smaller pulley 514 which, by means of a reducing gear train, is driven by a reversible shading coil motor 515. The shading coils 531 and 532 of this motor, as will be seen later, are controlled by the switch mounted on plate 468 described in the preceding paragraph.

Attached to part 512 is a plate 516, preferably made from steel, which has a generally circular shape, but carries one projection 517. This projection is adapted to come into operative contact with a number of electrically operated catches circularly disposed around shaft 510 and fastened to base plate 97.

Each of these catches consists of a solenoid comprising a preferably laminated core 518, a coil and a slidable armature 520. The coils are numbered 541 to 546, see Diagram 28. The armature which is biased by a spring 521 assumes the position shown in Fig. 26 as long as a coil is not energized, but is withdrawn as soon as current passes that coil. As can be seen, the head of the armature is of roughly triangular shape and has at its extreme forward end an indentation which has the same shape as the aforementioned projection 517 and which is adapted to receive the same.

As can be noted from Figs. 1 and 7, the entire test print support is ordinarily positioned within the housing of the main unit. It is, however, necessary to provide means by which the test print can conveniently be mounted on the surface of platform 511. For this reason, the entire assembly is hinged on a pivot 525, see upper right corner, Fig. 26, which in turn is fastened to the baseplate 90 supporting the computing device. On the left lower corner a plate 526 is provided ordinarily resting on a stop 527 which is also attached to baseplate 90. A handle 528 is attached to the upper left corner of plate 97 and is of such shape that it protrudes through a slot 529 of the housing of the main unit, Fig. 7. Whenever it is desired to mount a test print on platform 511 the entire unit can be rotated by means of handle 528 around pivot 525 and be lifted thereby through slot 529 above the housing of the main unit, whereupon the front face of platform 511 becomes accessible. During actual operation, plate 97 with all parts attached thereto occupies the position shown in Fig. 26.

The cooperation between the two switch assemblies shown in Figs. 23, 24 and 25, and the test print support shown in Figs. 26 and 27 can be seen on the wiring diagram shown in Fig. 28. The ultimate purpose of the entire arrangement is, of course, to transform the continuous movement of element 414, indicating the sum of three foot-candle-second values, into a step by step rotation of the test print support 511, whereby at all times that of the triangular diagrams become visible through a corresponding aperture in the front wall of the main housing, which received a total number of foot-candle-seconds most nearly equal to the total number of foot-candle-seconds determined by the computing device for a selected point of the image. Since, preferably, the total exposures of adjacent diagrams increase in geometric progression, the change over from one diagram to the other will generally take place as soon as the geometric mean value of two total exposures of two adjacent diagrams becomes larger or smaller than the one which is shown in the triangular window of the main unit. I. e., $S_0 = \sqrt{S_1 S_2}$, where $S_0$ is the value when changeover takes place, and $S_1$ and $S_2$ are the respective foot-candle-second values for two adjacent triangles.

The function of the switch mounted on plate 468 is quite simple. The motor 515 has a main coil permanently connected to the line and two shading coils 531 and 532, respectively. Coil 531 causes the motor and therewith turntable 511 to rotate in a clockwise direction and is connected between current conducting rings 480 and 482. Similarly, shading coil 432 causes the motor to rotate in a counter-clockwise direction and is connected between current conducting rings 480 and 481. Now, if shaft 462'' to which contact 471 and projection 472 are rigidly connected, is rotated in a counterclockwise direction, 472 makes contact with 475 which, in turn, is connected to 476, and in this manner shading coil 532 is shortened, causing motor 515 to rotate also in a counterclockwise direction. Similarly, if shaft 462'' is rotated in a clockwise direction, shading coil 431, is, in the same manner, shortened, causing motor 515 to rotate likewise in a clockwise direction. The movement of the motor is transferred through a train of gears and pulley 514 by a belt to pulley 513 and, thereby, to test print support 511. This test print support would, therefore, rotate in a like manner if it were not restricted by the mechanism I am now about to describe.

This mechanism consists of the switch mounted on plate 467 and the six electrically operated catches 541 to 546. These catches cooperate mechanically with a projection 517 described above and which is rigidly connected to the test print support 511. As can be seen in Fig. 28, one end of each coil is connected to one end of the line, and other ends are, respectively, connected to switch segments 501 to 506. The other end of the line is connected to current conducting ring 500. It can now be seen that the rotation of shaft 462', in a counter-clockwise direction, causes contact 491 and projection 492 to rotate likewise. This brings 492 in contact with 494 which, in turn, is connected to contact 497. Contact 497, in the position shown, rests on segment 502 connected to coil 542. Consequently, the armature of this coil is retracted and, if projection 517 was engaged by this armature, it was by this retraction released, and since the motor 515 and therewith disc 516 have the tendency to rotate in a counter-clockwise direction, projection 517, upon its release, rotated ⅙ of a revolution until it became engaged by the armature of coil 543, in which position it is now shown. Further rotation of the switch mounted on plate 467 in a counter-clockwise direction will cause contact 497 to leave segment 502 and come in contact with segment 503, thereby energizing coil 543. This, in turn, will release projection 517 again causing it to progress a step further until it becomes now arrested by the catch associated with coil 544.

Rotation of the two switches in a clockwise direction will first reverse the direction of motor 515, thereby giving plate 516 and projection 517 a tendency to rotate likewise in a clockwise direction. Referring to the switch mounted on 467, projection 542 will now be in physical and electrical contact with projection 495 and, therefore, the position of contact 496 instead of 497, as previously, will determine which of the six catches will be energized.

The reasons for this arrangement can best be seen by visualizing the operation of the device. Again the sum of the three exposure values in foot-candle-seconds shall be called S, and the respective values that this sum has for the various triangles of the test print shall be called $S_1$, $S_2$, $S_3$, and so on. Assuming that at the beginning S as delivered by the computing device has a very low value, the rotating and indexing support for the test print will be in a position in which the first triangle with the lowest value $S_1$ becomes visible through the aperture in the front wall of the housing of the main unit. At this time, the projection 517 is engaged by the catch associated with coil 541. If now, either by increasing the light intensity, for example by selecting a brighter point of the image, or by adjusting the exposure time, S assumes a larger value, the element 414 of the computing device, which by its position is indicative of S, moves during the computing process to the left, and the two switches on the right side of Fig. 28 rotates simultaneously in a counter-clockwise direction. As soon as S becomes larger than the mean geometric value $\sqrt{S_1 S_2}$, the second triangle with the next larger value $S_2$, rather than the first one with the values, becomes the one that has an exposure value most nearly equal to the value computed by the computing device. At this instance contact 497 touches segment 501. This completes the circuit which energizes the coil 541, and releases the associated catch. The test print support is now free to rotate in a counter-clockwise direction until projection 517 is arrested by the next catch associated with 542. The second triangle with an exposure value $S_2$ is now visible. It remains in the visible position until contact 497 due to further rotation of the switch touches the next switch segment 502. This happens when S becomes larger than the $\sqrt{S_2 S_3}$. Contact between 497 and 502 energizes coil 542. The associated catch is thereby retracted, releasing projection 517 whereupon the test print support is free to rotate again until projection 517 becomes arrested by the catch associated with 543. The third triangle with exposure value of $S_3$ is now visible.

Let us now assume that for some reason, for example, by dimming of the light or by choosing a shorter exposure time, the process is reversed and S assumes a smaller value than $S_3$. The part 414 of the computing device then moves during the computing process to the right, and the two switches shown on the right side of the diagram 28 move in a clockwise direction. In the beginning of this movement, contact 496 which now determines which of the catches will be energized, rests on segment 504, thereby energizing coil 544. Since the catch of this coil at that time is not arresting projection 517, its retraction has manifestly no effect. Only when contact 496 due to further clockwise rotation of the switch touches segment 503, will current flow through coil 543, and then projection 517 will be released. Due to the angular offset of 496 with respect to 497, this will take place as soon as S becomes smaller than $\sqrt{S_2 S_3}$, i. e., at the instance when the third triangle of the test print, with the exposure value $S_3$, ceases to represent the triangle with an exposure value most nearly equal to the exposure value computed by the computing device and when its place must be taken by the second triangle with exposure value $S_2$. The test print support can now rotate in a clockwise direction and bring the second triangular diagram into a visible position.

Should the value of S be still smaller, the clockwise rotation of the switches will continue and as soon as S becomes smaller than $\sqrt{S_1 S_2}$, contact 496 touches segment 502, energizing coil 542 and again releasing the test print support for another rotating and indexing movement.

By tracing the operation of the device in this manner it can be seen that by arranging the two contacts 496 and 497 in the manner shown, i. e., separated by an angle equal to the angle occupied by two switch segments and by automatically energizing one or the other in accordance with the direction of the rotation of the switches, the desired purpose is achieved of transforming the continuous movement of an element associated with a computing device into a step by step movement of a test print support, whereby at all times that one of the various diagrams is selected which received a total exposure most nearly equal to the computed total exposure in foot-candle-seconds of a selected point of the image.

It will be appreciated that the step by step mechanism shown in Figs. 23 to 28 is merely a preferred construction and that other designs can be worked out to serve the same purpose. It will be understood that I do not wish to limit myself to the specific execution of this mechanism as shown, but that I desire to protect the broad conception of a step by step movement actuated by a computing mechanism and which automatically selects that of several diagrams on the test print which received a total exposure, in foot-candle-seconds, most nearly equal to the total sum of the three exposures as computed by a computing device.

Point locating device

The purpose of this device is to locate a point within the selected triangle which has the same relative color composition with respect to the three primary colors, as a selected point of the image. More precisely, this means that the quotients of the three foot-candle-second values for light producing the three primary colors, respectively, divided by the total sum of all three foot-candle-second values, should be substantially the same for a point to be found on the test print as for a selected point of the image on the easel.

Referring back to the chapter in which the distribution within a triangle of the three respective foot-candle-second values of light producing the three primary colors was explained, it can be seen that all points representing a certain color percentage, or all points with the same quotient $$\left(\frac{tL}{S}\right)$$

lie on a straight line parallel to one of the sides of the triangle. The distance of this line from this side equals the distance of the opposite corner of the triangle to this side multiplied by the quotient $$\left(\frac{tL}{S}\right)$$

For any given point of the image the three lines representing the three color percentages, respectively, will have a common intersection whereby the corresponding point can be located within the area of the selected triangle. In reality, the intersection of two lines is, of course, sufficient to determine the location of this point, since the color percentage of the third color is merely the difference between 100% and the sum of the two other color percentages.

This principle has been incorporated in a mechanical device which was, as 98, already shown schematically in Fig. 7 and which is shown in detail in Figs. 29, 30 and 31. The area 570 of the selected triangle is shown in dotted lines. Two straight lines 571 and 572 parallel to two sides of the triangle are arranged in front of this triangle. This can be done in several ways, but I prefer to arrange in two slightly different planes two vanes 573 and 574 made from thin transparent material such as glass or, preferably, a plastic sheet, and on which the aforementioned lines 571 and 572 have been inscribed. These lines must be moved in accordance with the values $$\left(\frac{tL}{S}\right)$$

for two primary colors. These values, as we have seen in one of the previous chapters, were computed from the measured light intensity values on the easel and from the chosen exposure times, by means of the computing device. Referring back to Fig. 20, the computed quotients were represented by the respective positions of sliding elements 432 and 442. The position of these elements, must, therefore, in some manner be transmitted to the respective positions of the indicating lines 571 and 572. This can be done in numerous ways, and a typical one is shown in Fig. 29. The two vanes 573 and 574 are attached to angularly shaped supports 575 and 576 adapted to slide in the direction of arrows 575' and 576', respectively. It can be seen that the directions of these movements are at right angles to the movable straight lines 571 and 572. This rectangular relation is the preferred arrangement, but any other angle is conceivable as long as the movements of parts 575 and 576 do not become parallel to lines 571 and 572. Elements 575 and 576 are supported by grooved rollers 577 and 578 and small pinions 580 and 581, which, in turn, are mounted on a supporting plate 98. These pinions are in mesh with teeth cut into one side of the parts 575 and 576 forming a rack and which are indicated in Fig. 29, in the interest of simplicity, by dotted lines only. Pinions 580 and 581 are mounted on the same shaft that supports in Fig. 20 pinions 433 and 443 which, in turn, drive elements 432 and 442. The pinions on the same shaft, i. e., 580 and 433, and 581 and 443, do not necessarily have the same diameter and, as a matter of fact, 580 and 581 have a smaller diameter than 433 and 443. Regardless of the respective diameter, however, due to the fact that these pinions are mounted on the same shaft, the sliding elements, respectively, connected to them will travel distances which are proportional to each other, or the travel of element 575 and thereby the travel of straight line 571 will become proportional to the travel of element 432 of the computing device, and likewise the travel of 576 and of straight line 572 becomes proportional to the travel of element 442 of the computing device. If the respective diameters of the driving pinions are chosen correctly, the travel of the two straight lines 571 and 572 will equal the distance between the respective corners of the triangle to the opposite sides multiplied by the quotients $$\left(\frac{tL}{S}\right)$$

as indicated by the respective positions of computing elements 432 and 442. The point of intersection 590 of straight lines 571 and 572 becomes, therefore, the point to be located. The point thus found within the selected triangle of the test print was exposed to a combination of foot-candle-seconds of light producing the three primary colors most nearly equal to the expected exposure in foot-candle-seconds of the selected point of the image, and its appearance with respect to color and density will permit definite conclusions as to the future appearance with respect to color and density under the measured light conditions and under the chosen exposure time conditions of said selected point of the image on a color print yet to be made.

Methods to make color prints

The device described in the preceding paragraphs can be used to make color prints according to three slightly different methods. In the first two methods, a color transparency is used as the starting point, and the print is made on color print material of the monopack type. The difference between the two methods is that in the first method this monopack is subjected to three subsequent exposures with light of three different colors, whereas in the second method a single exposure with substantially white light is used. In the third method, I start with three separation negatives and make three subsequent prints on three separate sheets of color print material of the separation-transfer type.

Methods to make color prints on monopack by triple exposure to light of three different colors For this method, the device is equipped as follows: The printer or enlarger shown in Fig. 1 is provided with the electro-magnetically operated three color filter shown in detail in Figs. 2, 3 and 4. The filter 59 between lamp and transparency is usually unnecessary. Referring to the light measuring circuit shown in Fig. 8, the triple step switch 100' which controls the light sensitivity of the device is arranged as shown in this figure. The triple timer shown in Figs. 9 to 13 is used, and the main unit shown in Fig. 1, therefore, carries all the dials shown in this figure.

A color transparency is inserted into the printer or enlarger in the usual manner, and after the enlargement ratio is adjusted satisfactorily, an enlarged image of this color transparency is projected on the easel 50. On this image, the operator selects a number of points which appear important for the appearance of the final print. Selecting the first of these points, he places the photocell unit 80 on the easel in such a position that the selected point to be measured is projected into the aperture 86 of the photocell housing, Fig. 5. He then adjusts switch 170, Figs. 1, 8 and 13, to the "measuring" position and places switch 100 actuated by handwheel 130 and comprising the three triple step switches 100', 100'' and 100''' into the "red" position, see Figs. 1 and 8. It is advisable at this time to move handle 626 momentarily to the left so as to be sure that the mechanical parts of the light measuring unit start their operation from zero, rather than from some accidental position where they might have been left after a previous operation, see Fig. 12.

The diagram of Fig. 8 shows that in the "red" position of switch 100, the sensitivity of the photocell is determined by contact 129', action of switch 100', the thyratron-relay circuit controls clutch coil 157, action of switch 100'', the red filter is in front of the lens, action of switch 100''', and switch 170 is now in the position shown in solid lines, whereby terminals 171 in Fig. 8 and 171' in Fig. 4 receive current, energizing motor 68. The operator then depresses push button 134 which opens switch 134' and simultaneously closes switch 134'' and starts in this manner the functioning of the light measuring circuit and mechanism.

Referring to Fig. 8, it can be seen that before push button 134 was depressed, switch 134' short circuited condenser 131, and switch 134'' opened the circuit for the coil 157 of one of the magnetic clutches of the light measuring device shown schematically in Fig. 8, and in detail in Figs. 9 to 12. After switches 134' and 134'' have been actuated, the condenser 131 is no longer shorted and, therefore, begins to accumulate a charge. Likewise, 134'' is now closed and current can flow through coil 157. This causes the two opposite parts of the clutch 194 and 201 to come into contact, and shaft 197 begins to rotate. Condenser 131 is charged by two independent and parallel circuits, the first circuit comprising that part of the voltage divider 121 between points 132 and 133, the two last electrodes of the multiplier tube 119 and 120, and the respective connecting wires. The current flowing in this circuit depends upon two factors, i. e., the position of sliding contact 129' on voltage divider 128, whereby the light sensitivity of the photocell is adjusted and the illumination impinging upon the multiplier tube 82. The second circuit which tends to charge condenser 131 with a constant rate of speed comprises the resistor 141, the constant current element 135 and the wires connecting these elements to the two terminals of the condenser 131. It is immaterial in this respect that the constant current element 135 happens to be a second photoelectric cell.

The positive terminal of condenser 131 which is connected to electrode 119 of the multiplier tube is also connected to the grid 144 of a thyratron tube 142. The voltage that the grid assumes with respect to the cathode 143 is equal to the voltage of the left part of voltage divider 141, minus the voltage accumulated in condenser 131. At the beginning of the measuring process, the voltage of condenser 131 is zero, having been short circuited by switch 134', and consequently the voltage of grid 144 is negative with respect to the cathode 143. As condenser 131 charges up, the grid voltage becomes less and less negative, and finally reaches a critical value of approximately $-2$ volts. As long as the grid was more negative than $-2$ volts with respect to the cathode, the thyratron 142 did not conduct current, but as soon as the grid bias becomes less than $-2$ volts, current begins to flow in the thyratron 142. This, in turn, causes current to flow through relay coil 147 and this relay now opens contact 160, deenergizing thereby clutch coil 157. The two opposite clutch parts 194 and 201 thereupon become separated again by a spring provided for this purpose, and, while part 194 continues to rotate, parts 201 and 197 stop. It can be seen that in this manner shaft 197 is made to rotate at a constant speed for a length of time which is determined by the time it takes to charge condenser 131 to a predetermined voltage under the light conditions to which the photocell has been subjected, or the rotary travel of shaft 197 is a direct measure of the charging time of condenser 131 and thereby of the intensity of the red light impinging upon the selected point on the easel.

After coil 157 is deenergized again, shaft 197 comes to a standstill. It is biased by a spring 227 and tends to return to its starting position in a clockwise direction, but is prevented from doing so by a ratchet gear 204 and ratchet 621, Fig. 12. Mounted on shaft 197 is pinion 207 by means of which the rotary travel of shaft 197 is transmitted to the computing device or, more specifically, to element 325, see Fig. 20.

The rotation of pinion 207 which, as explained, is proportional to the charging time of condenser 131 and therefore constitutes a measure of the intensity of the red light impinging upon the selected point on the easel, causes sliding element 325 of the computing device to move from left to right. This obviously changes the angular position of pivoted arm 323 which is biased by a spring (not shown) so as to be in contact with projection 327 carried by 325. Pivoted arm 323 is carried by sliding element 320 operatively connected to one of the time switches. The adjustment of this and the other time switches is, at this time, purely coincidental and arbitrary, and element 320 as well as all other input elements of the computer remain at the present time stationary. Sliding element 330 is then moved by servomotor 337 until contact is again established between projection 331 and pivoted arm 323. The movement of sliding element 330 does two things, it changes the position of pivoted arm 370, and it also changes the position of projection 430. The position of pivoted arm 370 is determined by the position of both sliding elements 330 and 350. 350, however, remains stationary at this time. Arm 370 is biased by a spring in a counterclockwise direction and, therefore, tends to remain in contact with projection 371. Sliding element 372 is then moved by its servomotor 376 until contact is again established between projection 373 and arm 370. This changes the position of arm 380. The position of arm 380 depends upon the position of sliding element 372 which was just moved by its servomotor 376 and the position of sliding element 351 which at this time remains stationary. Pivoted arm 380 is biased by a spring in a counter-clockwise direction and, therefore, maintains its contact with projection 381 carried by sliding element 351. Sliding element 383 is now moved by its servomotor 385 until contact is established again between its projection 382 and arm 380. This changes the position of arm 413 which is free to rotate around its pivot 401 and which is biased by a spring in a counter-clockwise direction. Due to this bias, it tries to maintain contact with projection 412 carried by sliding element 383 at its upper end. Servomotor 421 then moves element 414 until projection 416 makes contact with arm 413. The position of arm 431 is now determined by the position of projection 430 carried by element 330 and by the position of projection 415 carried by element 414 or, in other words, servomotor 434 moves sliding element 432 on which arm 431 is mounted until 431 is in simultaneous contact with projections 415 and 430. In the same manner the position of arm 441 is determined by the position of projections 417 and 440, and servomotor 444 moves sliding element 442 carrying arm 441 until simultaneous contact is established between arm 441 and projections 417 and 440. Due to the arrangements described in detail in the preceding paragraphs and shown in the circuit diagram of Fig. 22, all servomotors will come to a standstill as soon as each of the pivoted arms is in simultaneous contact with the two projections carried by the two cooperating elements of the particular mechanised nomograph of which it is a part.

The sliding element 414 of the computing device is, in the manner shown in Fig. 23, operatively connected to the two switches mounted on plates 467 and 468. These switches determine, in the manner explained above in detail and shown in Fig. 25, the position of the rotating and indexing test print support 511. The cooperation of the two switches and of the step by step escapement mechanism for the test print support has the effect that always that one of the triangular diagrams becomes visible through the aperture in the front wall of the main unit which was subjected to a total exposure most nearly equal to the total exposure of the point of the image being analyzed. At the present stage of the process only the red light intensity of this point has been measured and, therefore, the position of sliding element 414 with its associated switches and consequently the position of test print support 511 is as yet of no significance. At the same time, sliding elements 432 and 442 determine the position of the two transparent vanes 573 and 574 which carry, respectively, the engraved straight lines 572 and 571. Again, since at the present time only the red light has been measured, the position of these elements has, as yet, no significance.

As soon as the mechanism driven by the various servomotors comes to a rest, the operator knows that the measuring and computing process with respect to the red light is finished, and he now relinquishes his hold on push button 134. The entire process is then repeated for the second primary color which is usually green. For this purpose, switch 100, handwheel 130, is turned to the "green" position. The sensitivity of the photocell is now determined by contact 129", action of switch 100'. The thyratron relay circuit controls clutch coil 158, action of switch 100", and the green filter is in front of the lens, action of switch 100'". Switch 170 is still in the position shown in solid lines, but the action of switch 100'" now energizes binding posts 172, Fig. 8, and 172', Fig. 4, thereby energizing motor 67, which actuates the green filter.

The operator then depresses push button 134 again, whereupon the entire measuring, computing, triangle selecting and point locating mechanism is again set in motion. Condenser 131 is again charged, but this time its charging time depends upon the position of contact 129" and the intensity of the green light impinging upon the photoelectric cell. Again, in precisely the same manner as explained above, coil 158 actuates the second clutch of the mechanical part of the light measuring device for a length of time determined by the charging time of condenser 131 and, during this time, pinion 208 travels for a certain angle. With reference to Fig. 20, pinion 208 actuates sliding element 345 of the computing device. At present, i. e., during the process of measuring the green light impinging upon the photoelectric cell, all input elements of the computing device except 345 are stationary, and the movement of 345 is transmitted in precisely the same manner as the movement of 325 before, i. e., 345 determines the position of arm 342, which, in turn, moves sliding element 350, changing the position of arm 370 and moving sliding element 372. Sliding element 372 moves with it arm 380 which, in turn, determines the position of sliding element 383. Its position is transmitted through pivoted lever 413 to sliding element 414 which now, by its position, indicates the sum of the red and green intensity of the light impinging upon the selected point of the image. The position of 414, in turn, through pivoted levers 431 and 441, changes the position of elements 432 and 442. At this time the measuring process is still incomplete since the blue light has not been measured and, therefore, the position of the test print support 511 determined again by the position of 414 and the position of the two transparent vanes with their engraved lines have still no significance.

As soon as the measuring and computing process for the green light is finished, the operator again releases push button 134 and changes the position of switch 100, handwheel 130, to the "blue" position. The sensitivity of the photocell is now determined by contact 129'", action of switch 100', the thyratron relay circuit controls the coil of the third clutch 159, action of switch 100", and the blue filter is in front of the lens, action of switch 100'". Switch 170 is still in the position shown in solid lines, but binding posts 173, Fig. 8, and 173', Fig. 4, are now energized together with motor 66 which brings the blue filter in front of the lens.

As soon as the operator depresses push button 134 for the third time, the measuring, computing, triangle selecting and point locating process is again performed, but this time for the blue light. The charging time of condenser 131 depends now upon the position of contact 129'" and upon the intensity of the blue light impinging upon the photoelectric cell. Coil 159 actuates the third clutch of the mechanical part of the light measuring device during the charging time of condenser 131, and pinion 209 rotates for a proportionate angle, thereby again setting certain parts of the computing device in motion. At this time, i. e., during the measuring of the blue light, all input elements of the computer except 346 are stationary. The movement of element 346 is transmitted through elements 343, 351, 380, 383, 413 to sliding element 414. The position of this element is now indicative of the total sum of the red, blue and green foot-candle-seconds. However, since at this time, the three time switches assume as yet some coincidental and arbitrary position the position of element 414 has still not much meaning. The movement of element 414, together with the movement of element 351, influences also through element 441 the position of element 442 and also in conjunction with element 431 the position of element 432. The position of these two elements is now indicative of the red and blue color percentages, respectively, i. e., their position indicates the two quotients $$\frac{tL_{red}}{S} \text{ and } \frac{tL_{blue}}{S}$$

Again, due to the arbitrary and coincidental setting of the time switches at this time, these two values have as yet not much meaning. The same is true of the subsequent setting of the test print support 511 and of the two crossing lines 571 and 572.

This is due to the fact that at this time the red, blue and green light intensities, respectively, are still multiplied by the computer with exposure time values which were arbitrary and coincidental, and the result delivered by the computer, i. e., the triangular diagram selected by it and the point located within this diagram by the two crossing lines 571 and 572, reflects this arbitrary and coincidental choice of the three respective exposure times. The consequence of this is that generally the device will indicate at this time that the predicted color rendition with respect to color and density of the point analyzed upon the easel is not satisfactory. It can be made satisfactory, at least within the limitations of the available color print material, by the subsequent manipulation of the three handwheels 91', 92' and 93' which determine the three respective exposure times for the red, blue and green exposures. For example, if the point traced by the mechanism on the test print has approximately the right color, but is too dense, all exposure times must be changed in one direction. It depends upon the nature of the process whether they have to be increased or decreased. Monopack color print material is usually of the reversible type, and in this case a print becomes lighter with increasing exposure times. Should the mechanism indicate that the point just analyzed would be rendered with approximately the right density but with an incorrect color, this can be corrected by changing the three exposure times unequally. Again, it depends upon the character of the color print material which of the exposure times has to be changed more than the others, and whether this change should be in the direction of an increase or decrease. For reversible monopack material, additional exposure with light of one color will decrease the density of this particular color. In this manner, the operator manipulates the three time switches until a substantially satisfactory rendition of the analyzed point on the easel is predicted by the device.

The manner in which actuating one of the time switches by means of, for example, handwheel 91', affects the result of the triangle selector and point locating device, i. e., the predicted color of the analyzed point of the image, can be traced with the aid of Figs. 14 and 20. Assuming that the operator manipulates handwheel 91', thereby changing the exposure time of the first, left, time switch which controls in this case the exposure with red light, the effect of this adjustment on the time switch itself is quite simple and was explained above, i. e., the rotation of handwheel 91' is transmitted through shaft 255 to arm 250' carrying the pin 250. The entire assembly is kept in the position chosen by the operator by means of gear 260 and spring loaded steel ball 264. The location of pin 250, in turn, determines the position of arm 245 which is pressed by spring 245' against pin 250. During the actual exposure later, arm 245 will be driven by the clock motor 242 in a clockwise direction until arm 245 makes contact with fixed pin 270. This contact will terminate the movement mechanically and will also establish an electric circuit which, through action of the relays 280 and 284, shown in Fig. 13, will terminate the exposure. The important fact in this connection is that adjustment of handwheel 91' adjusts the angle that arm 245 has to travel in a clockwise direction before it approaches pin 270 and that, in this manner, the exposure time can be adjusted.

Shaft 255 carries pinion 295 which is in operative contact with the teeth of a corresponding rack attached to sliding element 320 of the computing device, Fig. 20. During adjustment of the time switch, by means of handwheel 91', all input elements of the computing device except element 320 remain stationary. The movement of 320 is transmitted to the pivoted arm 323 which, since projection 327 with element 325 remain stationary, causes motor 337 to move element 330 until projections 331 and 327 again make simultaneous contact with arm 323. This changes the position of arm 370 attached to 330 causing element 372 to be moved by its servomotor 376 until projections 373 and 371 are in simultaneous contact with 370. The movement of 372 is transmitted through arm 380 to element 383 and from there, through arm 413, to element 414. The change in position of element 414 actuates the switches shown in Figs. 23 to 25 which, in turn, actuate the rotating and indexing test print support 511, causing another of the triangular diagrams to come into view through the corresponding aperture in the front wall of the main unit. The movement of element 414 also causes a change in the position of arm 441 and therewith of element 442 and, together with the change in position of element 330, it also causes a change in position of arm 431 and therewith of sliding element 432. The new positions of elements 442 and 432 are then, in the manner shown in Fig. 29, transmitted to the movable lines 571 and 572 which by their intersection now select another point within the chosen triangle as the one which most nearly will resemble the color and density with which the analyzed point of the image will be rendered. The effect of a change of position of handwheels 92' and 93' will, of course, be entirely corresponding. Generally, a uniform movement of all three handwheels in one direction will cause the selection of a new triangle with a lighter or darker overall density, but will not affect the location of the selected point within that triangle, whereas, for example, the manipulation of one handwheel in one direction and of another handwheel by the same amount in the opposite direction will not affect the selection of a triangle, but will affect the location of a selected point within said triangle. In this manner, the three exposure times can be manipulated until the most nearly satisfactory rendition of the selected point will be predicted by the device.

It is usually insufficient to adjust the machine so that it predicts a satisfactory rendition of only one point of one particular color because all other colors may be degraded by an excessive content of this color. For example, it is generally not sufficient to adjust a point in the sky for a satisfactory blue color because reds and greens will very often then show an excessive blue content. It is, therefore, advisable to repeat the entire process for other points having substantially different colors, for example, for a point which is red. If this is done, it will be found that satisfactory rendition of all colors at the same settings of the device is usually not possible, and the operator has to compromise, i. e., he has to permit a certain degradation of all colors, but at least he can balance them approximately and see that all reds, blues and greens, respectively, are afflicted with approximately the same amount of color degradation. It will be found that generally, in this manner, a print can be made which is most nearly satisfactory for the available color print material.

The machine is now ready for a print. The photocell is removed from the easel and a piece of color print material is placed thereon. Switch 170 is then put into the "exposure" position and handwheel 599, actuating switch 99 with its components 99' and 99", is then placed in the "red" position. Pressing push button 290 actuates the first time switch, see Fig. 13, and exposes the test print material on the easel to red light for a length of time determined by the position of dial 91'. After the termination of this first part exposure, handwheel 599 of switch 99 is put in the "green" position, and push button 290 is again depressed. This exposes the color print material on the easel to green light for a length of time determined by the position of handwheel 92'. The time switch in the center of Fig. 13 is now in the circuit.

After this, switch 99, by means of handwheel 599, is put into the "blue" position, button 290 is again depressed, and a "blue" exposure is given for a length of time determined by the position of handwheel 93', i. e., by the time switch shown on the right side of Diagram 13. The exposed print is then subjected to the normal treatment, i. e., developed, dyed, and fixed.

*Methods to make color prints on monopack by single exposure to white light*

For this method, the device is equipped as follows: The printer or enlarger shown in Fig. 1 has again an electromagnetically operated three color filter, but this filter is now used for measuring only, but not for the exposure. During the exposure it may either be taken off, or none of the three coils is energized so that none of the filters is, during the exposure, in the light beam. The device may even be modified by mounting a small replica of this filter changing device in front of the photoelectric cell rather than in front of the lens. A filter 59 between lamp and transparency is, as a rule, needed to correct the color of the light slightly. The light measuring circuit in Fig. 8 must again comprise a triple step switch 100' which controls the light sensitivity of the multiplier tube. The single timer shown in Figs. 17 and 18 is used instead of the triple timer used in the previous method, and the front view of the main unit will, therefore, differ slightly from its appearance shown in Fig. 1 since of the three handwheels 91', 92' and 93' only one, for example, 92' would be needed. This in turn makes switch 99 and handwheel 599 unnecessary since with only time switch available it is manifestly unnecessary to provide a selecting switch.

The light measuring method in itself is exactly identical to the one described in the previous method, i. e., the operator resets the device by means of handle 626, puts handwheel 170 on "measuring" and handwheel 130 on "red," depresses push button 134 and waits until the computing device comes to a standstill. He then puts handwheel 130 into the "green" position, depresses switch 134 again until the computer has finished its work. The procedure is finally repeated with handwheel 130 in the "blue" position. The function of the light measuring circuit and of the mechanical and electrical mechanism for the computing device is exactly the same as described above. The only difference is that now, due to the fact that pinions 305, 306 and 307 are mechanically tied together, as shown in Fig. 18, the sliding input elements of the computer 320, 340 and 341 move in unison and occupy at all times places at the same vertical level. By the action of the light measuring circuit and of the computing device, again one of the triangles of the test print is selected and made visible through the aperture in the front wall of the housing of the main unit, and again, the intersection of the two lines 571 and 572 locates one point within the selected triangle which is indicative of the future rendition of the analyzed point of the image. Again, since the position of the time switch during the measuring and computing process was coincidental and arbitrary and since, during this time, the filter 59 between lamp and transparency was either absent or also coincidental and arbitrary, this result, as yet, lacks significance, and the predicted rendition will again be unsatisfactory either with respect to color or with respect to density or usually with respect to both. If the color is satisfactory, but the density wrong, this can be simply corrected by increasing or decreasing the exposure time by means of handwheel 92'. The effect of this adjustment on the time switch can be seen in Fig. 18 and is in all respects comparable to the action of handwheel 91' described during the discussion of the first color print method. As can be seen in Fig. 18, chain 302 connects mechanically the three sprockets 299', 300' and 301' and therewith the three pinions 305, 306 and 307 which, in turn, actuate the sliding elements 320, 340 and 341 of the computing device. The action of the computing device, Fig. 20, is in no way different from its action as described for the previous method except that 320, 340 and 341 now move in unison. It can be easily comprehended that this movement will affect simultaneously the movement of sliding element 414 which represents the sum of three foot-candle-second values and the position of elements 330 and 351 which represent the red and blue foot-candle-second values, respectively. The position of elements 432 and 442, however, will not be affected by this adjustment since the two quotients $$\frac{tL_{red}}{S} \text{ and } \frac{tL_{blue}}{S}$$

will remain constant because all three foot-candle-second values have been changed simultaneously in the same proportion.

On the other hand, any undesirable color shift, for instance, a noticeably excessive red content, can be corrected by changing the filter 59 and inserting, for example, one with a cyan or "minus red" color. This will shift the expected colors of all analyzed points in such a way that they will be rendered with less red content. Corresponding corrections for other colors can, of course, be made by using correspondingly different filters in front of the enlarger lamp. This method of adjustment is usually somewhat complicated by the fact that the addition of filters in this manner not only changes the color of the analyzed point, but also its density because it affects the total number of foot-candle-seconds. This must then be separately corrected by manipulating hand-wheel 99' so as to restore a satisfactory density. It can be seen that the measuring and adjusting procedure for this method is somewhat less convenient than that for the first method since it may be necessary to repeat the light measuring process several times, always waiting for the computing device to turn in its result until an acceptable color rendition of the selected point of the image is predicted. The advantage of this method is that subsequently only one single exposure is done with white light, and a single exposure to white light obviously saves a great deal of time as compared to the triple exposure to light of three colors, as described in the first method. As some of the most promising monopack materials are quite slow and require long exposure times, this may be of considerable advantage.

The exposure, therefore, is simply accomplished by disconnecting three color filter either electrically or mechanically, removing the photoelectric cell from the easel and replacing it with a piece of color print material. A single exposure is then given by depressing push button 290 once. This exposure is done with substantially white light which is only slightly colored by the usually very light correction filter 59.

In the description of the first two methods it was more or less taken for granted that the transparency showed the image in actual colors and that the monopack material on which the print was made, was of the reversible type, so that it again showed the actual colors of the object. This assumption was made because materials of this type are the only ones commercially available at this time, but the two methods described are not necessarily limited to materials of this type. Instead of a transparency in actual colors, a so-called color negative can be used, i. e., a transparency which shows point for point the complementary colors of the actual object. For example, reds will be shown as greens, and a blue sky, for example, will appear yellow. Records of this type can be printed on monopack material which does not need to be reversible. The processing of such material will, therefore, be somewhat simpler than that of reversible material. The two methods described above are applicable to color negative transparencies and color print material of the non-reversible type without any change in principle except that a change in filter colors may be necessary.

*Methods to make color prints on color print material of the separation transfer type*

This method starts with a set of separation negatives. It is immaterial whether this set of separation negatives has been obtained by photographing an object three times through three different filters, or whether it was obtained by printing a natural color transparency three times through three different filters.

For this method the following equipment is used: The printer or enlarger shown in Fig. 1 is used without the three-color filter which is now unnecessary for both the measuring operation and the exposure. The filter 59 between lamp and transparency can also be dispensed with. The light measuring circuit shown in Fig. 8 may be simplified by omitting step switch 100' controlling the light sensitivity of multiplier tube or, if the device is equipped with a switch of this type, the three sliding contacts 129', 129'' and 129''' should be placed at the same point of resistance 128 so that, regardless of the position of switch 100', the device always has the same sensitivity. The triple timer shown in Figs. 13 and 16 is used and, therefore, the external appearance of the main unit corresponds again to Fig. 1, with all dials shown in this figure.

The electrical and mechanical functions of the light measuring unit and of the computing device are the same as explained above for the two other methods, and the method of operation is as follows: The operator resets the device by means of handle 626, puts handwheel 170 on "measuring," handwheel 130 on "red," places the "red" separation negative into the enlarger and depresses push button 134. The "red" separation negative is the one taken through the red filter. It is not red in appearance, but looks like an ordinary black-and-white negative. Depending upon the light intensity at the point analyzed by the photoelectric cell, the light intensity will then be measured and fed into the computing device in the manner already described in the preceding paragraphs. The "red" separation negative is then removed and replaced by the "green" negative. Care must be taken that after this has been done the photoelectric cell is placed precisely in the corresponding point on the easel. Since it is neither necessary nor always possible to have subsequent separation negatives in precise register with respect to their position within the enlarger, this may necessitate a slight shifting of the photocell for this purpose. Handwheel 130 is then put into the "green" position, and push button 134 is again depressed. The intensity of the light passing the "green" separation negative at the selected point is thereby measured and its value delivered to the computer. The "green" separation negative is then replaced by the "blue" negative and the procedure repeated, handwheel 130 now being in the "blue" position. This triple operation adjusts the computer for the three respective light values passing the three separation negatives at the point, or corresponding points, selected by the operator. At this time again the position of the three time switches is coincidental and arbitrary and, therefore, the result of the computing process, as indicated by the position of the test print support 511 and of the two lines 571 and 572, again lacks significance, and the predicted rendition of the selected point at this time will generally be unsatisfactory. It can again be made satisfactory, at least within the limitations of the available color print material, by manipulating the three timers by means of handwheels 91', 92' and 93'. This again changes, in precisely the same manner as described above, not only the three exposure times, but also affects the relative position of the elements of the computing device. This adjustment eventually reaches the test print support 511 and the two crossing lines 571 and 572 whereby the device automatically selects that one of the triangular diagrams which received a total exposure most nearly equal to the total number of foot-candle-seconds computed from the measured light intensities and the adjusted exposure times, and whereby the point of intersection of the two crossing lines 571 and 572 automatically locates that point within said triangle which has the same color percentages as the point of the image which has been analyzed.

Again, a satisfactory predicted rendition of one single point does not necessarily guarantee a pleasing quality of the entire picture, and it is usually necessary, or at least advisable, to check the rendition of several points. Again, it will usually be found that perfect rendition for all colors is not possible, and the operator has a choice to adjust the device for the perfect rendition of some colors, for example, the blues, by sacrificing quality of other colors, for example, the reds, or to compromise by permitting an approximately balanced degradation of all colors. It will usually be found that the last method gives the most nearly satisfactory print. After the measuring process has been completed, and after an adjustment of the three time switches has been found which promises to give the most nearly satisfactory print, the exposure is made in the following way: Switch 170 is placed on "exposure," switch 99, handwheel 599, is placed on "red," the red separation negative is put into the enlarger, and, instead of the photocell, a sheet of color print material is placed on the easel. This sheet is exposed by depressing push button 290 for the length of time for which handwheel 91' was set. The "red" separation negative is then replaced by the "green" one, knob 599 is placed on "green," and a second sheet of color print material is placed on the easel. Actuation of push button 290 exposes this second sheet for a length of time determined by the position of dial 92'. The process is again repeated by replacing the "green" separation negative with the "blue" one, turning knob 599 to "blue," and placing a new sheet of color print material on the easel. The third exposure then corresponds to the position of handwheel 93'. The three sheets are then processed in the usual manner and are transferred in register with and superimposed upon each other to a common base.

It will be understood that many of the features of this device, and the method of using it, are merely preferred embodiments and can be changed freely without departing from the spirit of this invention as defined in the appended claims.

What I claim as new, is:

1. A device for making color prints, comprising means to support a test print made on color print material and containing in systematic arrangement numerous areas representing different combinations of three primary colors in varying intensities, a printer including a source of light, a support for transparencies from which prints are made, and a support for said color print material on which said prints are made, said transparencies including records of the respective intensities of three primary colors, means to measure said recorded intensities of light of said three primary colors passing selected points of a transparency, means to adjust the exposure time to which said color print material is subjected, means to compute from said measured light intensities and from said exposure time a set of three values of foot-candle-seconds for each selected point of said transparency, and means to locate on said test print areas exposed to substantially the same three values of foot-candle-seconds as obtained by said computing means, whereby the rendition of selected points of said transparency on said color print material under the chosen light and time conditions can be predicted before a print is made.

2. A device for making color prints according to claim 1, said light measuring means comprising a condenser operatively connected to two parallel circuits and adapted to be charged by them simultaneously, said first circuit comprising a first source of voltage and a photoelectric cell, adapted to be placed substantially into the same plane as said color print material during the actual exposure, said first source of voltage, said photo electric cell, and said condenser connected in series whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said light, and means to measure the time needed to charge said condenser to a predetermined voltage.

3. A device for making color prints according to claim 1, said light measuring means comprising a condenser operatively connected to two circuits and adapted to be charged by them simultaneously, said first circuit comprising a first source of voltage and a photoelectric cell, adapted to be placed substantially into the same plane as said color print material during the actual exposure, said photoelectric cell being of the multiplier type including a photoemissive cathode and $n$ anodes, said source of voltage including a voltage divider with a starting tap and $n$ additional taps, the starting tap being of negative polarity and connected to said cathode, the other taps being progressively more positive and connected to corresponding anodes of said multiplier tube, and said condenser being inserted into the connection between the $(n-1)$st tap and the $(n-1)$st anode, whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said light, and means to measure the time needed to charge said condenser to a predetermined voltage.

4. A device for making color prints according to claim 1, said printer including three filters in three different colors, and means to move these filters, one at a time, into a position between said source of light and said color print material, said light measuring means comprising a photoelectric cell and an associated electric circuit, including means to adjust the light sensitivity of said circuit, and means to change color filters and the light sensitivity of said circuit simultaneously.

5. A device for making color prints according to claim 1, said light measuring means comprising a condenser operatively connected to two parallel circuits and adapted to be charged by them simultaneously, said first circuit comprising a first source of voltage and a photoelectric cell, adapted to be placed substantially into the same plane as said color print material during the actual exposure, said first source of voltage, said photoelectric cell, and said condenser connected in series whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said first-mentioned source of light, said current limiting means comprising a second photoelectric cell and means to illuminate said second photoelectric cell with a constant intensity, independent of the intensity of said first-mentioned source of light, and means to measure the time needed to charge said condenser to a predetermined voltage.

6. A device for making color prints according to claim 1, said light measuring means comprising a condenser operatively connected to two parallel circuits and adapted to be charged by them simultaneously, said first circuit comprising a first source of voltage and a photoelectric cell, adapted to be placed substantially into the same plane as said color print material during the actual exposure, said first source of voltage, said photoelectric cell, and said condenser connected in series whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said light, and means to measure the time needed to charge said condenser to a predetermined voltage, said means comprising a constant speed motor, a movable element, means to move said element by said motor, means to energize said motor while said condenser is charged, means to stop the movement of said motor when the voltage of said condenser has reached a predetermined magnitude, and means to measure the distance that said movable element has traveled during the charging period of said condenser.

7. A device for making color prints according to claim 1, said light measuring means comprising a condenser operatively connected to two parallel circuits and adapted to be charged by them simultaneously, said first circuit comprising a first source of voltage and a photoelectric cell, adapted to be placed substantially into the same plane as said color print material during the actual exposure, said first source of voltage, said photoelectric cell, and said condenser connected in series whereby said condenser, upon exposure of said photoelectric cell to light, is charged with a rate of speed in dependence of the intensity of said light, said second circuit comprising a second source of voltage and means to limit the current of said second circuit to a substantially constant value, said second source of voltage, said current limiting means, and said condenser connected in series, whereby said condenser is charged with a constant rate of speed, independent of the intensity of said light, and means to measure the time needed to charge said condenser to a predetermined voltage, said computing means by which said sets of three foot-candle-seconds for each selected point are obtained, comprising three mechanized nomographs, each including a first movable element, traveling in a straight line and operatively connected to said computing means to adjust the exposure time, its distance from a zero point being in proportion to said exposure time as adjusted by the operator, a second movable element traveling in a straight line parallel to the direction of travel of said first element but in the opposite direction, its distance from a zero point being in proportion to one of said foot-candle-second values, a third movable element adapted to travel in a straight line intersecting said two first-named straight lines, said two points of intersection being identical with said above-mentioned two zero points, a constant speed motor adapted to move said third element at a uniform rate of speed, means to energize said motor while said condenser is charged and means to stop its movement after said condenser has reached a predetermined voltage, the length of travel of said third element thereby being in proportion to said aforementioned condenser charging time, and the starting point of said travel being identical with said first-named zero point, one of said movable elements supporting a pivoted straight arm, the two other elements carrying a projection each, and means to keep said two projections in simultaneous contact with said arm, whereby the position of said second element is determined by the positions of said first and of said third elements.

8. A device for making color prints, comprising means to support a test print made on color print material and comprising a plurality of triangular areas, each of the three corners of each triangle having received full exposure to light producing one of three primary colors, the respective opposite sides having received no exposure to light producing said colors, and intermediate points having received three intermediate exposures in proportion to their respective distance from said three sides, whereby the sum of said three exposures in foot-candle-seconds remains constant for all points within a triangle, the magnitude of said sum, however, being different for different triangles, a printer including a source of light, a support for transparencies from which prints are made, and a support for said color print material, on which said prints are made, said transparencies including records of the respective intensities of three primary colors, means to measure said recorded intensities of light of said three primary colors passing a selected point of a transparency, means to adjust the exposure time to which said color print material is subjected, means to compute from said measured light intensities and from said exposure time a set of three values of foot-candle-seconds for said selected point of said transparency, and means to locate on said test print a point exposed to substantially the same three values of foot-candle-seconds as obtained by said computations, comprising means to compute for said selected point on said transparency the sum of said three values of foot-candle-seconds, means to select one of said triangles, the points of which were exposed to substantially the same sum of three values of foot-candle-seconds as computed for said selected point, means to compute for said selected point on said transparency the quotients of two of said foot-candle-second values corresponding to two primary colors, respectively, divided by said sum of all three foot-candle-second values, and means to locate a point within said selected triangle where the quotients of two foot-candle-second values, corresponding to the same two primary colors, divided by the sum of all three foot-candle-second values, is identical with the corresponding quotients as measured and computed for said selected point on said transparency, whereby the rendition of said selected point on said transaparency can be predicted by the appearance of said point thus located on said test print.

9. A device for making color prints according to claim 8, said means to compute, for said selected point on said transparency, the sum of the three values of foot-candle-seconds, comprising two mechanized nomographs, said first nomograph comprising a first element movable in a straight line and adapted to be displaced in proportion to the first of said foot-candle-second values, a second element movable in a straight line, parallel to said first straight line, and adapted to be displaced in proportion to the second of said foot-candle-second values, a third element movable in a straight line parallel to said first two straight lines and disposed half way between them, a pivoted straight arm carried by one of said elements, two projections carried by said two other elements, respectively, and means to keep said arm in simultaneous contact with said two projections, whereby the movement of said third element is controlled by the respective positions of said first two elements and becomes proportional to the sum of said first two foot-candle-second values, said second nomograph comprising a fourth element, movable in a straight line and rigidly connected to said third element, whereby its displacement is made proportional to the sum of the first two foot-candle-second values, a fifth element, movable in a straight line, parallel to said straight line in which the fourth element moves, and adapted to be displaced in proportion to the third of said foot-candle-second values, a sixth element, movable in a straight line parallel to the straight lines in which the fourth and fifth elements move, and disposed between them, the distance between the lines of movement of the fourth and sixth elements, respectively, being half of the distance between the lines of movement of the sixth and fifth elements, respectively, a pivoted straight arm carried by one of the last-named three elements, two projections carried, respectively, by the two others of said last-named three elements, and means to keep said last-mentioned arm in simultaneous contact with said last-mentioned two projections, whereby the movement of said sixth element is controlled by the respective positions of said fourth and fifth elements and becomes proportional to the sum of all three foot-candle-second values.

10. A device for making color prints according to claim 8, said device comprising a housing with a triangular aperture in its front wall, said aperture being of the same size as one of said triangular areas on said test print, said means to support said test print being positioned within said housing and behind said front wall, whereby one of said triangular areas on said test print beeomes visible, said means to select one of said triangles including means to move said support, said last-mentioned means being in operative connection with and controlled by said means to compute the sum of the three values of foot-candle-seconds for a selected point on said transparency.

11. A device for making color prints according to claim 8, said device comprising a housing with a triangular aperture in its front wall, said aperture being of the same size as one of said triangular areas on said test print, said means to support said test print comprising an indexing and rotatable turntable, positioned within said housing and behind said front wall, whereby one of said triangular areas on said test print becomes visible, the triangles on said test print grouped symmetrically around a common center, covering together a polygonal area, said center coinciding with the axis of rotation of said turntable, said means to select one of said triangles including means to index and rotate said turntable, said last-mentioned means being in operative connection with and controlled by said means to compute the sum of the three values of foot-candle-seconds for a selected point on said transparency.

12. A device for making color prints according to claim 8, said device comprising a housing with a triangular aperture in its front wall, said aperture being of the same size as one of said triangular areas on said test print, said means to support said test print comprising an indexing and rotatable turntable, positioned within said housing and behind said front wall, whereby one of said triangular areas on said test print becomes visible, the triangles on said test print grouped symmetrically around a common center, covering together a polygonal area, said center coinciding with the axis of rotation of said turntable, said means to select one of said triangles including reversible power means to rotate and index said turntable, a projection attached to said turntable and a plurality of electromagnetically operated catches, grouped in a circle around the axis of said turntable and adapted to engage said projection and to arrest the rotation of said turntable in both directions, and electric switching means in operative connection with and controlled by said means to compute the sum of all three foot-candle-second values, comprising a first switch adapted to control the direction of said reversible power means, said direction depending upon whether said sum, as computed by said computing means, is increasing or decreasing, and a second switch adapted to energize said electromagnetically operated catches, one at a time, whereby a catch is withdrawn and said turntable is permitted to rotate one step in one or the other direction, depending upon said first switch, until it is arrested by the next catch, said means to rotate and index said turntable and said switching means cooperating to make automatically, through said triangular aperture of the front wall of said housing, that one of said triangles visible which has received a total exposure in foot-candle-seconds substantially equal to the total exposure of said selected point on said transparency.

13. A device for making color prints according to claim 8, said means to compute for a selected point on said transparency, two quotients of foot-candle-second values of two colors, respectively, divided by the toal number of foot-candle-seconds of all three colors, comprising a scale transformation unit and two mechanized nomographs, said scale transformation unit comprising a first element adapted to move in a straight line, its distance from a zero point being proportional to the numerical value of the sum of the three foot-candle values on a linear scale with uniformly spaced divisions, said element being operatively connected to said computing means for said sum, a second element adapted to move in a straight line intersecting said first-named straight line, two projections carried by said first two elements, respectively, a straight pivoted arm with a fixed pivot point, and means to keep said arm in simultaneous contact with said two projections, whereby the position of said second element is determined by the position of said first element and its distance from a zero point is adjusted in accordance with the numerical value of said sum on a projected scale with non-uniformly spaced divisions, each of said two mechanized nomographs comprising a third and sixth element, respectively, being rigidly connected to said second element and thereby moving in a straight line in accordance with the numerical value of said sum on a projected scale with non-uniformly spaced divisions, a fourth and seventh element, respectively, adapted to move in straight lines which intersect the line of movement of said third and sixth elements, these elements operatively connected to the computing means of two of the three foot-candle-second values, respectively, whereby their respective distance from two zero points is made proportional to two of said foot-candle-second values, a fifth and eighth element, respectively, adapted to move in straight lines parallel to the lines of movement of said fourth and seventh elements, but in the opposite direction, the zero points of the movements of the third and sixth elements, respectively, and the zero points of the movements of the fourth and seventh elements, respectively, coinciding with each other and with the intersections of their respective lines of movement, and the zero points of the movements of the fifth and eighth elements, respectively, coinciding with the points of intersection of the lines of movement of the third and fifth, and of the sixth and eighth elements, respectively, the third, fourth and fifth elements forming parts of one, and the sixth, seventh and eighth elements forming parts of another mechanized nomograph, one element of each nomograph carrying a pivoted straight arm, and the two other elements carrying one projection each, and each nomograph including means to keep said pivoted arm in simultaneous contact with said two projections, whereby the respective distances of said fifth and eighth elements from two zero points are made proportional to the respective quotients of two of the three foot-candle-second values divided by the sum of all three foot-candle-second values.

14. A device to make color prints according to claim 8, said means to locate a point within said selected triangle comprising means to superimpose on said selected triangle two straight and intersecting lines, said lines running parallel, respectively, to two sides of said triangle opposite those corners which received full exposures, producing the same colors as those for which said two quotients were, respectively, computed, and means to adjust the respective distances of said superimposed straight lines from the triangle sides to which they are parallel, to a magnitude equal to the distance of each side to its opposite corner multiplied by the corresponding of said two quotients, whereby the point within said triangle upon which the point of intersection of said two lines appears superimposed, becomes the point to be located.

15. A device to make color prints according to claim 8, said means to locate a point within said triangle comprising two movable sheets of transparent material positioned in two different planes parallel to and in front of the plane of said test print, two straight lines engraved on said sheets and parallel, respectively, to two sides of said selected triangle opposite those corners which received full exposures, producing the same colors as those for which said two quotients were, respectively, computed, and means to adjust, by moving said sheets, the distance of said lines from the two respective sides of said triangle to which they are parallel, to a magnitude equal to the distance of said side from the opposite corner of said triangle, multiplied by the corresponding one of the two quotients, said last-named means being in operative connection with and controlled by said computing means for said two quotients, whereby the point within said triangle upon which the point of intersection of said two straight lines appears to be superimposed, becomes the point to be located.

ALFRED SIMMON.

REFERENCES CITED

The following references are of record in the file of this patent:

UNITED STATES PATENTS

| Number | Name | Date |
| --- | --- | --- |
| 2,090,825 | Anthony | Aug. 24, 1937 |
| 2,269,161 | Morse | Jan. 6, 1942 |
| 2,399,577 | Simmon | Apr. 30, 1946 |
| 2,414,338 | Simmon | Jan. 14, 1947 |

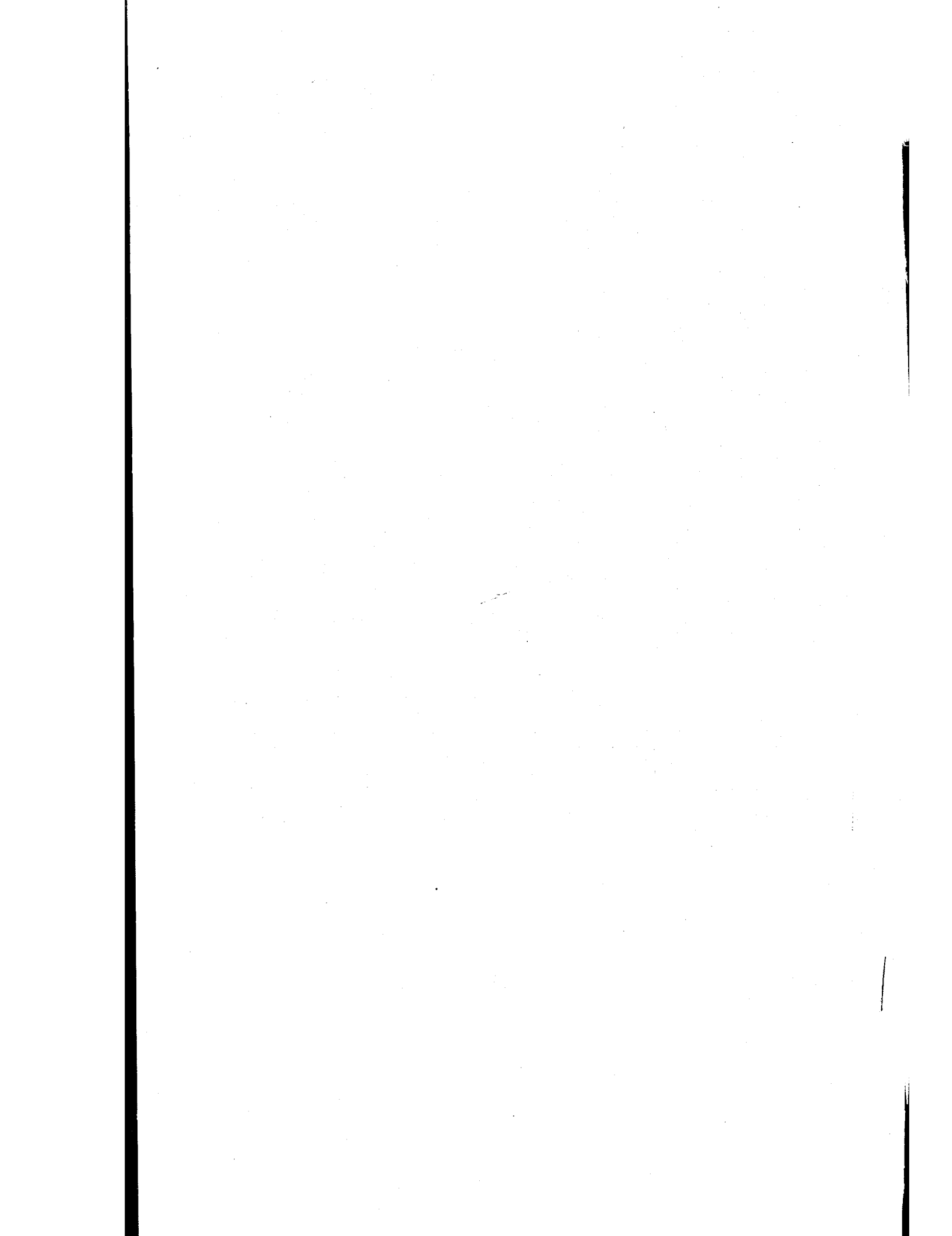

March 23, 1948.   H. J. CALLAHAN   2,438,331
SHIP'S TELEGRAPH RECORDER
Filed May 10, 1945   2 Sheets-Sheet 1
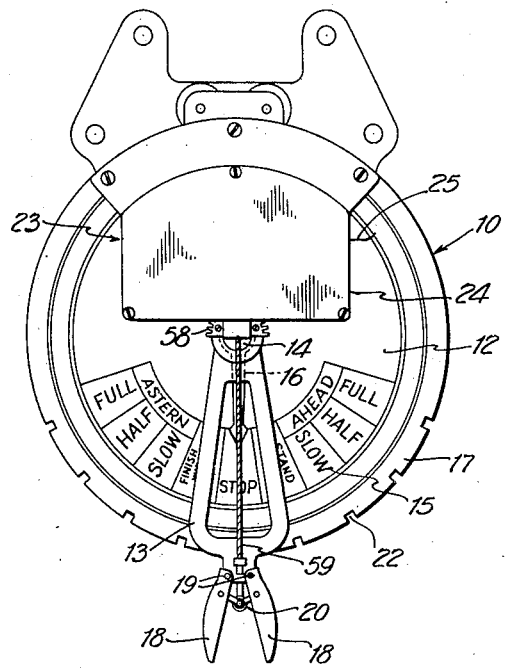
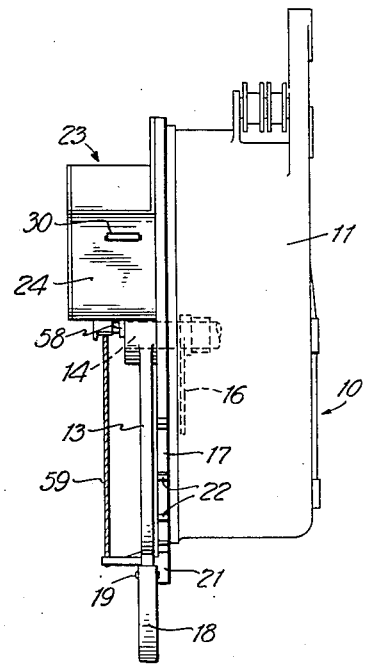
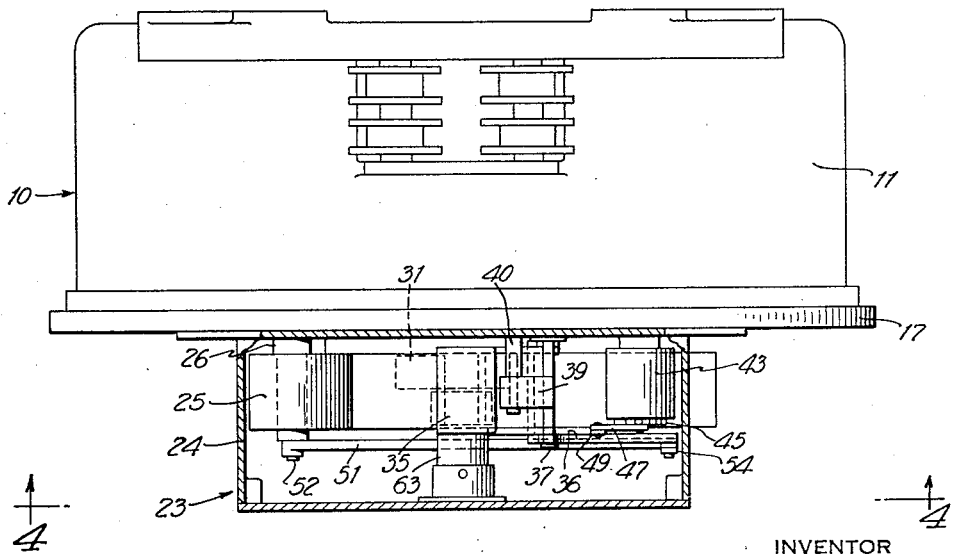
INVENTOR
HUGH J. CALLAHAN
BY
ATTORNEYS